United States Patent [19]

Asaoka et al.

[11] 4,326,991

[45] Apr. 27, 1982

[54] PROCESS FOR PREPARING A CATALYST FOR HYDROTREATMENT OF HEAVY HYDROCARBON OILS

[75] Inventors: Sachio Asaoka; Yoshimi Shiroto; Munekazu Nakamura, all of Yokohama; Takeo Ono, Kawasaki,

[73] Assignee: Chiyoda Chemical Engineering & Construction Co., Ltd., Yokohama, Japan

[21] Appl. No.: 84,764

[22] Filed: Oct. 15, 1979

[30] Foreign Application Priority Data

Oct. 14, 1978 [JP] Japan ............................. 53-125689
Dec. 13, 1978 [JP] Japan ............................. 53-153200

[51] Int. Cl.³ ..................... B01J 21/06; B01J 21/10; B01J 23/22; B01J 27/04
[52] U.S. Cl. .................... 252/432; 252/435; 252/437; 252/439; 208/251 H
[58] Field of Search .............. 252/439, 456, 432, 435, 252/437; 208/251 H

[56] References Cited

U.S. PATENT DOCUMENTS

| | | | |
|---|---|---|---|
| 3,553,106 | 1/1971 | Hamilton et al. | 208/251 |
| 3,558,474 | 1/1971 | Gleim et al. | 208/108 |
| 3,576,737 | 4/1971 | Mitchell | 208/251 |
| 3,696,027 | 10/1972 | Bridge | 208/210 |
| 3,723,294 | 3/1973 | Gatsis et al. | 208/86 |
| 3,723,297 | 3/1973 | Gatsis et al. | 208/95 |
| 3,766,058 | 10/1973 | Hensley | 208/210 |
| 3,798,156 | 3/1974 | Hensley | 208/216 |
| 4,066,530 | 1/1978 | Aldridge et al. | 208/112 |
| 4,152,250 | 5/1979 | Inooka et al. | 208/251 H |
| 4,191,636 | 3/1980 | Fukui et al. | 208/110 |

FOREIGN PATENT DOCUMENTS

| | | | |
|---|---|---|---|
| 2421978 | 11/1975 | Fed. Rep. of Germany | 208/251 R |
| 1002045 | 8/1965 | United Kingdom . | |
| 1123136 | 8/1968 | United Kingdom | 252/439 |

*Primary Examiner*—W. J. Shine
*Attorney, Agent, or Firm*—Armstrong, Nikaido, Marmelstein & Kubovcik

[57] ABSTRACT

A catalyst for the hydrotreatment of heavy hydrocarbon oils, which is prepared by supporting more than 2% by weight of $VS_x$, wherein x represents about 1.1–1.59 in terms of an atomic ratio of S/V, on a substrate composed of a clay mineral which consists of magnesium silicate as a major component and having a double-chain structure and a process for preparing the catalyst are provided. The catalyst is prepared by accumulating the $VS_x$ on the substrate using a heavy hydrocarbon oil which contains particularly large amounts of vanadium and sulfur.

4 Claims, 12 Drawing Figures

4,326,991

PROCESS FOR PREPARING A CATALYST FOR HYDROTREATMENT OF HEAVY HYDROCARBON OILS

BACKGROUND OF THE INVENTION

1. Field of the Invention

The present invention relates to a catalyst for removing undesirable materials such as asphaltene, heavy metals, sulfur, and the like contained in heavy hydrocarbon oils by catalytic hydrotreatment whereby said heavy hydrocarbon oils are converted to more valuable hydrocarbon oils.

2. Description of the Prior Art

By the term "heavy hydrocarbon oils" as used in this specification is meant heavy crude oils, residual oils obtained by distilling heavy crude oils under normal pressure or reduced pressure, crude oils extracted from tar sand, and mixtures of these oils. These heavy hydrocarbon oils usually contain undesireable impurities such as so-called asphaltene, i.e., a non-distillable coke precursor which has a high molecular weight and is insoluble in light hydrocarbons such as pentane and heptane; oil-soluble organic metal compounds containing vanadium, nickel, etc.; sulfur compounds; and nitrogen compounds.

These impurities are in most cases contained in high molecular weight hydrocarbon fractions such as asphaltene rendering it very difficult to perform the hydrotreatment of the heavy hydrocarbon oils. By the term "hydrotreatment" as used in this specification is meant the treatment of heavy hydrocarbon oils in the presence of hydrogen and catalysts for (1) converting high molecular weight fractions such as asphaltene contained in the oils into distillable light fractions or fractions soluble in light hydrocarbons and (2) at the same time for removing or reducing the above-mentioned undesirable impurities or contaminants such as metals, sulfur compounds and nitrogen compounds.

At present, as commercial processes for obtaining high-quality light oils by hydrotreating these heavy hydrocarbon oils, there are known processes in which the heavy hydrocarbon oils are subjected to hydrodesulfurization or hydrocracking using a catalyst comprising a transition metal such as cobalt, molybdenum, nickel, or the like, supported on a carrier composed of active alumina such as $\gamma$-alumina, $\eta$-alumina, or $\chi$-alumina, or silica, silica alumina, silica magnesia or the like, in a fixed bed system or ebullating bed system. (T. Ohtsuka, "Catal. Rev., Sci. Eng.", 16(2), 291–325 (1977) and R. V. Driesen, "Preparation of Symposium on Recent Improvements and Developments of Refining Processes and Catalysts", Tokyo, Japan, October, 26–27 (1978)).

However, these processes have the disadvantage that the presence of asphaltene and heavy metals in the feed oils causes various economical disadvantages.

More particularly, since the asphaltene colloidally dispersed in the feed oils is a huge molecule, it does not readily diffuse to the active points in the pores of a catalyst, thus hydrocracking is impeded. Also, the presence of asphaltene accelerates greatly the formation of coke and carbonaceous materials, which results in reducing rapidly the activity of the catalyst.

Furthermore, another difficulty is that the metals which are contained in large amounts in the feed oils accumulate on the surface of the catalyst thereby poisoning the catalyst and considerably shortening its life.

Thus, in the case where heavy hydrocarbon oils are treated by a catalytic hydrotreating process using a conventional catalyst, a large amount of catalyst is consumed per unit amount of oil passed. Moreover, even when the above-mentioned various difficulties can be overcome by these processes, if it is the main object to obtain light oils by causing the selective cracking of asphaltene, the use of a conventional catalyst not only necessitates establishing strict reaction conditions but also promotes deterioration of the catalyst. Moreover, under these conditions the violent gasification of light oils due to their secondary cracking reactions not only makes it difficult to obtain light oils in high yields but also increases the consumption of hydrogen, thus causing a great loss in economy.

In order to overcome these difficulties, various processes have recently been proposed as disclosed in, for example, Japanese Patent Publication Nos. 33,563/76; 42,804/77 and 5212/78. According to these processes, heavy hydrocarbon oils are converted into light hydrocarbon oils by recycling an activated catalyst composed of fine particles of vanadium sulfide, the vanadium sulfide being prepared, for example, by activating vanadium tetrasulfide dispersed in a heavy hydrocarbon oil in the form of slurry or an oil-soluble vanadium compound such as, for example, vanadium resinate mixed with a heavy hydrocarbon oil in a condition of high temperature and high pressure.

Because these processes employ a slurry process using a non-supported vanadium sulfide catalyst it will be easily understood that another serious difficulty will arise in practice. As a typical process for performing a catalytic hydrotreating process at high temperature and high pressure employing a slurry process, a direct liquefication process of coal has been known for a long time. However, it is also known that slurry processes have common problems in that the operation procedure is complicated, troubles such as plugging of passages are liable to occur and specific techniques are required for separating and recovering the fine particles of catalyst from mixture of the catalysts and product oils, so that in order to commercialize these processes, many problems remain to be solved.

Thus, in the prior art it is difficult to perform the catalytic hydrotreatment of heavy hydrocarbon oils containing large amounts of asphaltene and of heavy metals, such as vanadium, in a conventional commercial reactor, such as a fixed bed system, and hence there is a need to develop catalysts which are suitable for the purpose and can maintain a high activity for a long period of time.

The members of a group including the present inventors have made various investigations for a few years to discover catalysts effective for the catalytic hydrotreatment of heavy hydrocarbon oils and free from the deficiencies of the conventional catalysts.

It was discovered that a catalyst comprising one or more transition metals such as cobalt, molybdenum or vanadium supported on a catalyst carrier prepared from inorganic oxides composed mainly of magnesium silicate, in particular, naturally occuring sepiolite, shows high activity and high selectivity for the metal removal of heavy hydrocarbon oils and applications relating to these inventions were filed in the United States. These include U.S. Pat. No. 4,152,250 and U.S. Pat. No. 4,196,102.

Also, it was found that when heavy hydrocarbon oils containing large amounts of asphaltene and heavy metals such as vanadium were subjected to catalytic hydrotreatment using the above-mentioned catalyst, asphaltene was selectively cracked simultaneously with the removal of the metals in the oils (U.S. Patent Application No. 913,114, now U.S. Pat. No. 4,191,636.

The present inventors, who noticed a unique phenomenon on the catalyst in the course of the investigation of the treatment of heavy hydrocarbon oils using the above-mentioned catalyst, have further investigated to develop catalysts which are less expensive and more effective for the hydrotreatment of the heavy hydrocarbon oils.

The unique phenomenon found by the inventors is the interaction between the catalyst carrier composed mainly of naturally occuring magnesium silicate, and the heavy metals and asphaltene contained in heavy hydrocarbon oils that are deposited on the catalysts. This phenomenon results in the catalyst being continuously activated by the accumulations formed on it by the treatment of the oils at high temperature and high pressure in the presence of hydrogen. The inventors have made various experimental investigations of the phenomonon.

As the result, it has been determined that a catalyst comprising vanadium sulfide supported on a specific substrate composed of a naturally occuring mineral clay which consists mainly of magnesium silicate and which has a double-chain structure, which is defined for the Japanese "fukusa-kohzoh" disclosed in page 30 of "Clay Handbook", edited by the Japanese Clay Society in 1967, such as, for example, sepiolite, attapulgite or palygorskite, is very effective for the catalytic hydrotreatment of heavy hydrocarbon oils containing large amounts of asphaltene and heavy metals such as vanadium, and that the catalyst also has a novel characteristic that in the process using the above catalyst, asphaltene is selectively cracked simultaneously with the demetallization and desulfurization and yet the activity of the catalyst can be maintained for a long period of time without being deactivated by the heavy metals which deposit on the catalyst. Based on this knowledge, the invention has been accomplished.

SUMMARY OF THE INVENTION

Thus, the catalyst of this invention is a novel catalyst for the hydrotreatment of heavy hydrocarbon oils, which comprises at least about 2% by weight of vanadium sulfide, based on the weight of the vanadium, represented by the formula:

$$VS_x$$

(wherein x represents about 1.10–1.59, or preferably 1.20–1.55 in terms of the atomic ratio of S to V) supported on a substrate composed of a clay mineral which consists mainly of magnesium silicate and has a double-chain structure.

The vanadium sulfide represented by the formula $VS_x$, as the main component of the catalyst of this invention, is a non-stoichiometric compound in which the atomic ratio of sulfur to vanadium is about 1.10–1.59, or preferably about 1.20–1.55.

In general, vanadium sulfide is one of the typical Berthollide compounds and it is known that there are many crystalline compounds of this type having an atomic ratio of sulfur to vanadium ranging from 1:3 to 4:1 and, although they have a definite crystalline structure in a certain range of the atomic ratio of sulfur to vanadium, the atomic ratio of the elements does not show a simple integral ratio but varies within certain limits. (See, "Nonstoichiometric Metal Compounds", Fundamental Course on Metal Properties, Vol. 15, edited by Metal Society, published by Maruzen in 1971.)

In particular, $VS_x$, which is the main component of the catalyst of this invention, is considered to have the structure intermediate between VS having a structure of NiAs type and $VS_2$ having a structure of $CdI_2$ type. When considering the NiAs type as the base, the $CdI_2$ type may be regarded as having such a structure that the metal atoms in the metallic layers (vanadium layers) are missing in every other layer. Therefore, as the atomic ratio of sulfur to vanadium increases, intermediate compounds between VS and $VS_2$ come to have a crystalline structure wherein a gradually increasing number of metal atoms (vanadium atoms) in the metallic layers of the crystal of VS type are missing in every other layer. That is, such as intermediate compound has a structure in which the layers fully occupied with metal atoms and the layers containing metal defects are alternately superimposed, so that if the metal defect in the metal-missing layer is $\frac{1}{2}$, the intermediate is $V_3S_4$, whereas if the metal defect is $\frac{1}{4}$. the intermediate is $V_5S_8$.

On the other hand, as to the $V_3S_4$ phase, there is known the existence of $VS_x$ in which the atomic ratio of sulfur to vanadium is in the range of 1.20–1.55, and also, as to the $V_5S_8$ phase, it is reported that vanadium has a tendency of forming zigzag chains in the layer fully occupied with vanadium so as to make a kind of stabilized metal cluster (see, Kawada et al, "Report of Inorganic Material Research Institute", Vol. 12, 30–38 (1977)).

It has been confirmed by elemental analysis and X-ray diffraction pattern that the $VS_x$ (supported on the substrate) which is the main component of the novel catalyst of this invention has a crystalline structure belonging to the $V_3S_4$ phase. Although it is said that because the $V_3S_4$ phase is situated between the VS phase and the $V_5S_8$ phase as explained above, it has many vanadium defects (cation defects) and shows unique electric and magnetic properties due to the coexistence of different valence states, it is considered by the present inventors that such physicochemical properties are responsible for the specific catalytic activity for the hydrotreatment of heavy hydrocarbon oils as is shown in this invention.

In this invention, the novel catalyst for the hydrotreatment of heavy hydrocarbon oils is obtained by surrounding the $VS_x$ on a substrate which has a specific physical structure to form a composite material which can exhibit the multiple effects of the substrate and $VS_x$ to the utmost. When the hydrotreatment of a heavy hydrocarbon oil containing large amounts of vanadium and sulfur is performed using the novel catalyst of this invention, vanadium removal and desulfurization reactions for the heavy hydrocarbon oil occur simultaneously with the cracking reaction of asphaltene and, moreover, the vanadium and sulfur thus removed from the oil deposit on the surface of the catalyst as $VS_x$, which newly exhibits catalytic activity for the demetallization, desulfurization, and selective cracking of asphaltene. Further, since the asphaltene is cracked as mentioned above, the accumulation of coke on the catalyst is decreased, rendering it possible to maintain the high activity of the catalyst for a long period of time.

No such phenomenon has ever been seen in the past. That is to say, it has been newly found by the inventors that the vanadium compounds contained in heavy hydrocarbon oils, which have hitherto been considered to poison the above conventional catalysts for hydrotreatment, such as the conventional Ni-Co-Mo-(γ-alumina) catalyst, deposit on the substrate, when used in this invention, as an activator for the catalyst. Moreover, the $VS_x$ cannot be supported on a carrier used in the state of a slurry, but it can maintain a high catalytic activity when supported on a solid carrier, so that the catalyst of this invention is a very excellent one for the practical purposes surpassing all conventional catalysts.

The mechanisms of the various catalytic reactions accompanying the hydrotreatment, such as cracking of asphaltene, demetallization, desulfurization and the like, that are caused by the catalyst of this invention have not as yet been sufficiently clarified, but they involve unique reactions which has never been seen in the case of conventional catalysts.

The characteristic features of the reactions that were found from the observation of the properties of the oils treated using the catalyst of this invention are as follows:

(1) With a comparatively small consumption of hydrogen, the desulfurization proceeds to a considerable extent, being accompanied by the selective cracking of asphaltene and the demetallization.

(2) The average molecular weight of asphaltene remaining in the treated oil is greatly reduced with the decrease in the content of asphaltene contained in the heavy oil, which is defined as an insoluble matter in normal-heptane.

(3) The vanadium removal proceeds throughout the whole fractions of heavy hydrocarbon oils but the most remarkable is from asphaltene.

(4) In asphaltene fractions, asphaltene having higher molecular weight shows a higher conversion ratio.

DETAILED DESCRIPTION OF THE INVENTION

Figure 1:
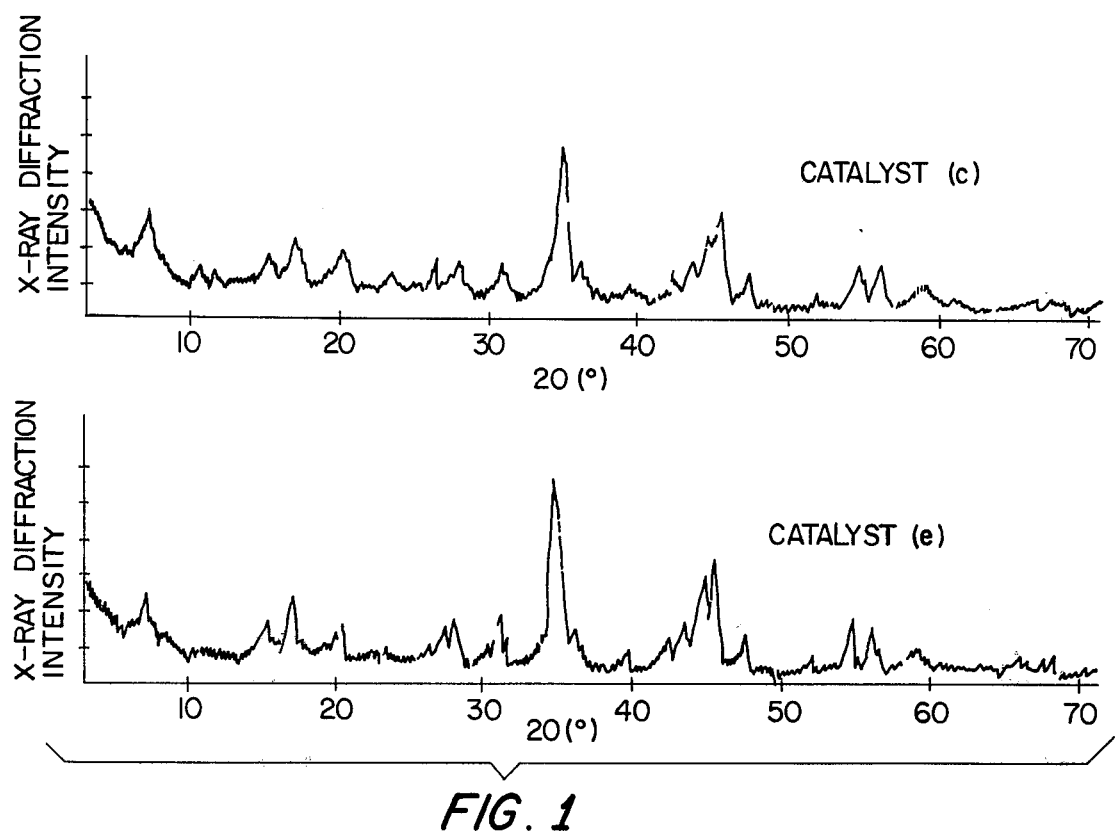
FIG. 1 shows the powder X-ray diffraction patterns of Catalysts (c) and (e).

It is believed that asphaltene is composed of micellar huge molecules formed by the association of several high molecular weight molecules having aromatic condensed rings and is dispersed in the colloidal state in oils. Also, it is believed that vanadium plays an important role in the association of the asphaltene molecules in such a way that it forms intramolecular and intermolecular complexes with the asphaltene molecules as an organic vanadyl (VO) compound or the like, whereby the asphaltene molecules are associated to form micelles (see, T. F. Yen; "In Role of Trace Metals in Petroleum", Ann Arbor, Mich.; Ann Arbor Scientific Publishers, 1975).

Considering together such information about the properties of asphaltene and the above-mentioned characteristic features of the reactions, the reaction mechanisms associated with the catalyst of this invention may be considered to be as follows (at least qualitatively): Firstly, the asphaltene contained in the heavy hydrocarbon oil diffuses through the pores of the substrate to be adsorbed on the $VS_x$ of the active source, supported beforehand, within the interior and on the surface of the substrate, where the vanadium removal and the desulfurization occur. In this case, the vanadium of the vanadium complexes present in and between the molecules of asphaltene is withdrawn as $VS_x$ and deposits on the surface of the catalyst to be fixed thereon. On the other hand, since the micelles of asphaltene lose the vanadium complexes, the associated molecules of asphaltene disintegrate and change into smaller molecules, which are readily desorbed, so that this may be reasonably considered as indicating the lowering of the molecular weight of asphaltene. Also, since the $VS_x$ itself formed during the reaction shows newly the activity for the cracking of asphaltene, it is expected that the catalyst can maintain its high activity for a long period of time without being poisoned by vanadium at all. Furthermore, the substrate constituting a part of the catalyst of this invention also plays an important role in enhancing the effect of the hydrotreatment of heavy hydrocarbon oils. That is, because the substrate itself has a effective physical structure such that the high molecular weight hydrocarbon fractions such as asphaltene, etc., can easily diffuse into the active points of the pores, the catalyst of this invention comprising such a substrate is effective for the selective reaction of high molecular weight hydrocarbons such as asphaltene. Additionally, since the $VS_x$ formed during the reaction is selectively fixed on the surface, such a catalyst can maintain a high activity without lowering the activity for the cracking of asphaltene. In addition to the above, the catalyst of this invention is also characterized by the fact that it not only selectively cracks the coke precursors such as asphaltene and the like, but also causes no accumulation of coke (which lowers the activity of the catalyst) even against asphaltic heavy hydrocarbon oils by virtue of the hydrotreating ability of $VS_x$ as well as the unique physical structure and chemical properties of said substrate, so that the high activity of the catalyst can be maintained for a long period of time.

While hydrocracking with a conventional catalyst for hydrotreatment such as Ni-Co-Mo-(γ-alumina) catalyst is mainly hydrodealkylation based on the hydrogenation and hydrocracking of polycyclic aromatics, hydrotreatment employing the catalyst of this invention, as described above, involves mainly: removal of the metal interposed between the asphaltene molecules constituting the asphaltene micelles, a decrease in the association degree of the micelles resulting therefrom, and lowering in the molecular weight accompanying the cracking of the comparatively weak bonded portions, so that it is considered that the consumption of hydrogen becomes unexpectedly small in spite of the lowering in the molecular weight.

The proportion of $VS_x$ in the catalyst is suitably more than about 2% by weight on the basis of the weight of the substrate as vanadium. It has be confirmed that if the proportion of $VS_x$ supported on the substrate is less than about 2% by weight on the basis of the weight of the substrate as vanadium, no sufficient activity is obtained, whereas even if it is greater than about 20% by weight, no improved activity is obtained. As the substrate of the catalyst, useful are the porous clay minerals which are composed of magnesium silicate as a major component and which have a so-called double-chain structure. Any of the naturally occuring minerals and synthesized materials of this type may be used. Among them, preferable are magnesium silicate hydrate clay minerals. Particularly, natural clay minerals in the classification of mineralogy, such as sepiolite, attapulgite and/or palygorskite are most preferable. These materials are not only available at low cost but also their activity for reactions can be much improved by virtue of their unique physical structure.

Furthermore, as is shown in before-mentioned "Clay Handbook", the above-described minerals are those which have a crystalline form of a double-chain structure type among numerous clay minerals and, differing from other clay minerals, they have no layer lattice structure but a double-chain lattice structure having a chain structure similar to amphibole as the fundamental structure. Attapulgite has a fibrous form, and sepiolite has two forms known as a fibrous, tubular crystal which is called α-sepiolite and an indeterminate scaly crystal which is called β-sepiolite, but the naturally occuring sepiolite is usually composed of their mixture. Palygorskite is also a mineral akin to attapulgite, but the former is of hydrothermal origin differing from the latter which is found in deposits and moreover the former is of low crystallinity so that it is a mineral belonging to a sepiolite-paramontmorillonite system.

The compositions of these naturally occuring minerals known by the above-described names differ according to their places of production but they can be defined according to the following range of chemical composition.

That is, the substrate used in this invention is a clay mineral composed mainly of magnesium silicate having a double-chain structure, e.g., a mineral called meerschaum or sepiolite having a composition of 46-53 wt.% $SiO_2$, 0.6-8 wt.% $Al_2O_3$, 0.7-22 wt.% $Fe_2O_3$, 0.7-3 wt.% $FeO$, 12-23 wt.% $MgO$, 0.5-1 wt.% $CaO$, 8-13 wt.% $H_2O(+)$, and 8-11 wt.% $H_2O(-)$; attapulgite having a composition of 53-58 wt.% $SiO_2$, 8-11 wt.% $Al_2O_3$, 2-4 wt.% $Fe_2O_3$, less than 0.2 wt.% $FeO$, 8-11 wt.% $MgO$, 1-2 wt.% $CaO$, less than 0-3 wt.% $K_2O$, less than 1 wt.% $Na_2O$, 8-12 wt.% $H_2O(+)$, and 8-10 wt.% $H_2O(-)$; and palygorskite having a composition of 52-62 wt.% $SiO_2$, 6-19 wt.% $Al_2O_3$, 0.8-4 wt.% $Fe_2O_3$, 0.2-0.8 wt.% $FeO$, 5-15 wt.% $MgO$, 0.1-3 wt.% $CaO$, 10-14 wt.% $H_2O(+)$, and 6-11 wt.% $H_2O(-)$; these minerals, are used alone or in combination. In the above compositions, $H_2O(-)$ is the weight loss occurring when the sample is dried in an air at 105-110° C. and $H_2O(+)$ is the weight difference between this and the calcining loss.

In nature, it is often found that all these minerals contains di-valent or tri-valent metals such as Fe, Cr, Mn and Cu by which a portion of Mg has been replaced, or contain other clay minerals such as dolomite or indeterminate silica, silica alumina or silica magnesia as impurizies. These impurities are not objectionable to this invention and it is unnecessary to remove these impurities.

Any of such raw materials has a effective physical structure due to a specific crystal structure.

For example, a sepiolite mineral from Spain is a clay mineral containing a considerable proportion of fibrous crystals having a surface area of 150-200 $m^2/g$ and a pore volume of 0.3-1.0 cc/g, and a sepiolite from Korea is an asbestos-like mineral almost composed of fibrous crystals having a surface area of 50-400 $m^2/g$ and a pore volume of 0.3-3.0 cc/g. Also, a sepiolite from Japan (Akan-machi, Hokkaido), in which a considerable part of Mg has been replaced by Fe, is a mineral having a surface area of 150 $m^2/g$ and a pore volume of 0.9 cc/g.

Furthermore, an adsorbent commercially available under the trade name of Sol Speedi Dri from Engelhard Co. is a kind of natural attapulgite which is a clay-like material having a surface area of 120 $m^2/g$ and a pore volume of 0.5 cc/g and, a palygorskite from Syria is a powdery material having a surface area of 120 $m^2/g$ and a pore volume of 0.6 cc/g.

As described above, these natural clay minerals may differ somewhat in physical properties and appearance but they are all porous materials, and it has been confirmed under an electron microscope that they contain a large proportion of fibrous crystals.

The catalyst of this invention also includes an embodiment where an additional catalytic component is supported on the substrate as will be explained later. That is to say, in the case of hydrotreatment of heavy hydrocarbon oils, where in addition to the cracking of asphaltene and the demetallization it is also desired to remove hetero-atoms, for example, by desulfurization or denitrification, or to reduce Conradson carbon residue, a catalyst according to the present invention having an additional catalytic component supported on the substrate and $VS_x$ or a catalyst having an additional catalytic component mixed with the substrate may be employed. For example, according to this invention in order to improve desulfurization activity, one or more transition metals selected from the group consisting of molybdenum, cobalt, nickel, tungsten, and copper is supported as the additional catalytic component, or in order to carry out denitrification as well as to reduce the Conradson carbon residue, one or more elements selected from the group consisting of boron, phosphorus, and titanium is supported as the additional component singly or in combination with the above-mentioned metal components.

In order to carry out the supporting or compounding of these additional catalytic components they may be added to the substrate either prior to the supporting of $VS_x$ or simultaneously with the supporting of $VS_x$. Thus, the order of adding these components is not critical.

The respective content of the additional catalytic components in the catalyst of this invention is preferably about 0.1 to about 20% by weight as the oxide of each component based on the weight of the substrate.

The desirable physical properties of the catalyst or substrate of this invention are as follows:

(1) The strength is typically higher than 1 Kg/5 mm on an average as the crushing strength in the diametral direction.

(2) The bulk density is typically about 0.3 to about 1 cc/g.

(3) The pore volume is about 0.3-2 cc/g, of which at least 0.1 cc/g is of pores having a pore diameter larger than 400 Å.

(4) The average pore diameter is about 100-1,000 Å.

(5) The surface area (taken as the surface area of pores having a pore diameter larger than 75 Å) is about 40–400 m²/g.

The above-mentioned physical properties of the catalyst largely affect the catalytic activity and the life of catalyst. From the point of the catalyst life, it is necessary that the pore volume be sufficiently large for depositing metals therein but if the pore volume is too large, the bulk density of the catalyst becomes small, resulting in the lowering of the activity per packed volume as well as in the lowering of the mechanical strength of the catalyst, and hence it is preferred that the pore volume be in the range of about 0.3–2 cc/g. The pore diameter should be such that the huge molecules of asphaltene can easily diffuse in the pores. However, if the diameter is too large, the surface area of the catalyst decreases, resulting in lowering of the catalytic activity, and hence it is preferred that the pore diameter be in the range of about 100 to about 1,000 Å. Also, the surface area is desirably in the range of about 40 to about 400 m²/g by the restrictions as described above.

Usually, the physical properties indicated above are referred to those of the catalyst. However, as later described, in the case where $VS_x$ is directly supported on the substrate with heavy hydrocarbon oils in a hydrotreating reactor, the substrate has the physical properties indicated above.

Now, the process for preparation of the catalyst of this invention will be explained below.

First, for the substrate of the catalyst, the above-mentioned natural clay mineral having a double-chain structure, such as sepiolite, attapulgite, palygorskite, etc. is used as it is, or after being merely crushed to below 1–5 mm, or after being further processed for attaining the above-described physical structure. The most simple and effective processing is high-temperature calcining and the calcining temperature is usually 250°–1,000° C. In addition, when the above-described physical properties of the catalyst desirable for the hydrotreatment of heavy hydrocarbon oils is not attainable by such processing alone, the physical properties such as the pore volume, average pore diameter, surface area, etc. are adjusted to the desirable ranges by processing and molding the substrate as described below. As the processing process in the case of using a molded substrate, the clay mineral as the raw material for the substrate is crushed to 50 mesh or finer as it is or after being dried or calcined at about 100°–1,000° C. Crushing may be performed in either a wet system or a dry system. Then, after wetting the crushed product by adding thereto about 1–2 times the weight of the substrate of water, the mineral is kneaded well in an ordinary kneading machine and after further wetting the kneaded mixture so that the water content becomes about 80–350% by weight, the mixture is molded as an extrusion molding or granular molding.

The extrusion molding is preferably of a columnar form but it may also be of a hollow cylindrical form, with the cross section being non-circular, elliptic or polylobal such as trilobe or the like. The granular molding may be formed by any appropriate method such as, for example, a prilling method or wet granulation method.

The moldings are, then, dried in the air for about 30 minutes to 24 hours at a temperature of about 100° C. to 200° C. and thereafter calcined in the air or in flowing air at a temperature of about 200° C. to 1,000° C. In addition, as the case may be, the moldings are air-dried for more than 24 hours at room temperature prior to drying. When the moldings are quickly calcined by omitting the air drying or the drying step, the relative proportion of the pores having a large pore diameter tends to become comparatively large.

Also, when the kneading is not feasible in the above-mentioned kneading step, about 5–20 times the weight of the substrate of water is added and stirred sufficiently to form a gel instead of kneading and after the gel has been dehydrated by normal pressure or reduced pressure filtration, press filtration, or centrifuging to readjust the water content of the cake to about 50–350% by weight, the dehydrated product may be molded. When the gel is not easily formed by the addition of water only, it is preferred to stir the mixture under heating or add thereto a suitable amount of ammonium chloride, etc. prior to stirring.

Also, a portion or all of the water used in the above-mentioned processing step may be replaced by an alcohol such as ethanol or isopropanol, acetone, or other non-aqueous liquids.

The substrate molded by the above-mentioned method has a very large pore volume and an improved surface area as compared with those of natural minerals, so that the activity and the like of the catalyst can be greatly improved.

That is to say, by properly adjusting the above-mentioned factors such as the extent of kneading in the processing step for the substrate, the water content at the time of molding, and the temperature, speed, and time of drying or calcination, moldings having various physical properties; 0.3–2 cc/g pore volume, 100–1,000 Å average pore diameter, and 40–400 m²/g surface area can be obtained.

Furthermore, the catalyst carrier prepared from a sepiolite mineral by the process described in U.S. Pat. No. 4,152,250 may be used as the substrate in this invention.

Also, in order to increase the strength of moldings, a sol such as silica, alumina, etc., a clay mineral, or other known molding aids may be added.

Moreover, the physical and chemical properties of the substrate can be improved by treating it with an acid or an aqueous alkaline solution to remove impurities or to process its surface.

For example, calcium carbonate (including aragonite or calcite) and dolomite present as an impurity in the raw material for a substrate has no directly bad effect on the activity of the catalyst, but, since they are unstable compounds, they may be decomposed and removed beforehand using an aqueous acid solution.

Also, by abrading moldings together, mechanically pulverizable portions existing on the surface of the substrate can be removed or the surface of the substrate can be roughened. A catalyst comprising a thus treated substrate shows some improvement in its activity.

Various processes for preparing the catalyst of this invention are described below.

First, the process of preparing the catalyst most effectively and economically involves a process wherein a heavy hydrocarbon oil containing large amounts of vanadium and sulfur is brought into contact with the substrate in the presence of hydrogen under specific reaction conditions to deposit a definite amount of $VS_x$ on the surface of the substrate directly from the heavy hydrocarbon oil by vanadium removal and desulfurization. Since in the above-mentioned process the $VS_x$ can be supported directly on the substrate by virtue of the reactions, the $VS_x$ is selectively deposited on the substrate especially at the places within the pores of the substrate where the reactive molecules such as asphaltene in heavy hydrocarbon oils can diffuse easily or at the sites where the demetallization and desulfurization actually occur, so that a catalyst having high activity and selectivity is obtained.

In the above-mentioned process, the higher the content of vanadium in the heavy hydrocarbon oil used when $VS_x$ is supported on the substrate, the more effective the process becomes, but practically it is desirable to use a heavy hydrocarbon oil containing more than 200 ppm of vanadium, preferably more than 400 ppm of vanadium.

The use of a heavy hydrocarbon oil containing less than 200 ppm of vanadium is not only disadvantageous because the treating time is prolonged but also fatally disadvantageous in that the velocity of coke formation due to the polycondensation of high molecular materials such as asphaltene is so much faster than the velocity of $VS_x$ accumulated that the effective accumulation of $VS_x$ is severely hindered.

Therefore, examples of the desirable heavy hydrocarbon oils for the above-mentioned process are, practically, a high-asphaltene and high-heavy metal Venezuelan crude oil having a specific gravity (D 15/4° C.) of 1.004, an asphaltene content of 11.8% by weight, a vanadium content of 1240 ppm, a sulfur content of 5.36% by weight, and a nitrogen content of 5800 ppm and a vacuum residual oil of Near Middle East origin having a specific gravity (D 15/4° C.) of 1.038, an asphaltene content of 8.2% by weight, a vanadium content of 270 ppm, a sulfur content of 3.53% by weight, and a nitrogen content of 7300 ppm.

Also, a heavy hydrocarbon oil having comparatively low contents of vanadium and sulfur, in which vanadium, etc. have been concentrated by an appropriate technique such as, for example, distillation, solvent extraction, etc. may be used as the processing oil for the substrate.

When a heavy hydrocarbon oil having a particularly low content of sulfur is used for processing the substrate, it is effective to use hydrogen sulfide gas as the sulfur source. In this case, it is preferred to intermix the hydrogen sulfide with the hydrogen gas in a concentration of 2–30 mol %.

The process whereby $VS_x$ is deposited on the substrate should be conducted at a temperature of 350°–450° C., preferably 390°–420° C., and under a hydrogen pressure of 30–250 atm., preferably 80–160 atm. If the processing temperature is lower than 350° C., the vanadium removal reaction and desulfurization from the heavy hydrocarbon oil will scarcely occur, while if the temperature is over 450° C., cooking and thermal cracking become too vigorous to achieve the effective deposition of $VS_x$.

If the hydrogen pressure is lower than 30 atm., the coke formation on the substrate becomes so vigorous that the vanadium removal reaction is substantially suppressed. On the other hand, if the hydrogen pressure is over 250 atm. side reactions such as hydrocracking, etc. occur vigorously, so that the cost for the apparatus including the reactor is greatly increased as is the consumption of hydrogen, thereby adversely effecting the economics of the process.

The reaction system employed for performing the above-mentioned processing may be an ordinary flow type reaction system such as a fixed bed system, a moving bed system, a fluidized bed system, a tubular system, or a batch type reaction system using an autoclave, etc.

When performing the activation processing of the substrate of the catalyst in a flow-type reaction system, the processing is carried out at a liquid space velocity of $0.1$–$10$ $hr^{-1}$, preferably $0.2$–$5$ $hr^{-1}$ under the conditions of maintaining the aforesaid processing temperature and hydrogen pressure.

Furthermore, the mixing ratio of the processing hydrocarbon oil and the hydrogen or hydrogen rich gas being supplied is 100–2,000 normal liter/liter (Nl/l), preferably 500–1,000 Nl/l of hydrogen at 15° C. per volume of the processing oil at 15° C. under one atmospheric pressure.

It has been confirmed by elementary analysis and X-ray diffraction that the active vanadium compound deposited on the substrate by the above-mentioned processing is vanadium sulfide. However, the vanadium sulfide thus deposited is a non-stoichiometric compound having the S/V atomic ratio in a wide range of 1.1–1.6 and is crystallographically of the crystalline structure of monoclinic system belonging to the $V_3S_4$ phase.

Also, the deposited sulfide is mostly vanadium sulfide but according to the result of elementary analysis, it sometimes contains a small amount of nickel. This is because the heavy hydrocarbon oil used as the processing oil for the substrate contains a considerable amount of nickel in addition to vanadium and a nickel removal reaction occurs simultaneously with the vanadium removal reaction. Therefore, it may be considered that some of the deposited $VS_x$ exists in the state in which portion of V has been replaced by Ni. Thus the deposit on the substrate which consists mainly of $VS_x$ such as containing Ni, etc. in the above described processing oil is also effective as the catalyst of this invention.

With regard to the relation between the amount of vanadium sulfide accumulated on the substrate and the activity of the catalyst it has also been confirmed that when the proportion of vanadium sulfide is higher than 2% by weight as vanadium on the basis of the weight of the substrate, the activity of the catalyst becomes remarkable, whereas when it exceeds about 20% by weight, the activity becomes almost constant, so that even if the deposited amount becomes higher than 100% by weight, the same activity is maintained.

In the above-mentioned process of preparing a catalyst by depositing vanadium on the substrate from a heavy hydrocarbon oil, the processing conditions can be established within the same ranges as the conditions of performing the catalytic hydrotreatment of heavy hydrocarbon oils. Therefore, the preparation of the catalyst and the hydrotreatment of heavy hydrocarbon oils can be performed successively without the necessity of recharging the catalyst and using the same reactor. Also, when the heavy hydrocarbon oil to be subjected to the hydrotreatment contains a comparatively large amount of vanadium, the heavy hydrocarbon oil per se can activate the catalyst which is very favorable for the commercial purposes.

Next, a process of preparing a catalyst by supporting a definite amount of $VS_x$ on the substrate in the aforesaid manner using oil prepared specifically by adding a predetermined amount of an oil-soluble organic vanadium compound to the hydrocarbon oil will be described.

Oil-soluble organic vanadium compounds used in this instance include vanadium resinate; vanadium porphyrin; vanadium phthalocyanine; vanadium salts of alicyclic or aliphatic carboxylic acids represented by naphthenic acid, aromatic carboxylic acids represented by toluylic acid, phenols, di- and polyhydroxy aromatic compounds; oil-soluble organic vanadium compounds with fatty acid amines, aromatic amines, quaternary ammonium compounds, etc.; and organic complex compounds of acetylacetone, methylnaphthalene, ethylenediamine tetraacetate, etc. with vanadium.

Also, the medium oil in which the oil-soluble organic vanadium compound is dissolved and compounded can be ordinary petroleum hydrocarbon oil, creosote oil, anthracene oil freed from crystal, etc. and a solvent such as decalin, tetralin, etc.

Further, the sulfur source may be hydrogen sulfide, carbon disulfide, heterocyclic sulfur compounds such as thiophene, phenylthiophene, etc., mercaptanes and aromatic compounds such as thiophenols and disulfides which may be added in predetermined amounts to the medium oil.

Another process of preparing the catalyst of this invention involves bringing the substrate into contact with a non-oily medium, a non-hydrocarbon medium or a polar medium containing a soluble vanadium compound as later described to support said vanadium compound on the substrate, and thereafter subjecting the substrate to a sulfiding by an appropriate process. By the term "non-oil medium" is meant a medium such as an aqueous solution an alcohol solution, etc. Examples of operable soluble vanadium compounds are vanadium oxalate, vanadyl sulfate, ammonium metavanadate, acetylacetone vanadium, vanadium oxide, etc.

Since vanadium compounds are generally sparingly soluble in water, it is preferred to increase their solubility by heating the medium or acidifying or alkalifying it. For example, the solubility of ammonium metavanadate in water is 0.52 g/100 g $H_2O$ (15° C.) and 6.95 g/100 g (96° C.) and from a temperature near 96° C., the decomposition of the vanadium compound begins. Thus, when a vanadium compound having a low solubility in water is used, oxalic acid is frequently added thereto to increase the solubility of the compound and improve the deposition of vanadium on the substrate.

As the process for supporting a vanadium compound on a substrate by contacting the substrate with a non-oil medium containing the vanadium compound, there may be employed an impregnation method, an immersion method or the like. These are conventional techniques for supporting a catalyst on a substrate.

A vanadium-containing substrate obtained by the above-described process is dried and then calcined to decompose the vanadium compound into vanadium oxide. Thereafter, the substrate is subjected to a sulfiding, whereby the vanadium oxide on the substrate is converted into $VS_x$. In general, the sulfiding comprises: (a) a first process wherein the substrate is brought into contact with an organic medium containing a sulfur compound in the presence of hydrogen; or (b) a second process wherein the substrate is brought into contact with hydrogen sulfide or a mixture of hydrogen and hydrogen sulfide. In the first process, the sulfiding is usually conducted at about 200°–400° C. and 1–150 atm. while, in the second process, the temperature is 100°–1,000° C. and the partial pressure of hydrogen sulfide is about 0.01–50 atm.

In addition, the catalyst of this invention can be obtained by subjecting the vanadium compound on the substrate directly to sulfiding after calcining the vanadium compound in a reducing atmosphere, or, alternatively, without calcining, thereby avoiding the conversion of the vanadium compound into vanadium oxide by the calcination as in the previously-mentioned step wherein the vanadium-containing substrate is calcined to convert the vanadium to vanadium oxide.

Alternatively there is also a process wherein the vanadium compound on the substrate, after being subjected to sufficient sulfuration by the above-described method, is reduced in hydrogen or a controlled hydrogen sulfide atmosphere to give $VS_x$ having the desired composition. For example, it is proposed in Japanese Patent Application Laid Open No. 7795/75 that the vanadium compound be allowed to stand for a long period of time under a controlled partial pressure of sulfur ($S_2$) whereby there is obtained a $VS_x$ having a thermodynamic equilibrium composition which is determined by the existing temperature and partial pressure of hydrogen sulfide or hydrogen (or $S_2$).

As disclosed in the specification of Japanese Patent Application No. 95,146/78 by the applicant of this invention, still another process may also be applied, in which the volume ratio of hydrogen and hydrogen sulfide is maintained in a definite range.

The process for making the above-described additional catalytic component, which improves the catalytic activities toward the hydrodesulfurization, the hydrodenitrification and the reduction of Conradson carbon residue, will be explained below.

Any starting material and any process for preparing the catalyst of this invention containing the additional catalytic component may be employed if said additional catalytic component is effectively and dispersively supported on the substrate or intimately mixed with the substrate.

For example, various compounds containing one or more elements as the additional catalytic components can be used and these compounds may be prepared by various methods suitable for the starting materials; to wit:

Examples of molybdenum compounds used for this purpose are oxides (e.g., $MoO_3$, $MoO_2$, etc.), molybdic acid and the salts thereof (e.g., $H_2MoO_4$, $H_2MoO_4.H_2O$, $(NH_4)_6Mo_7O_{24}$, $(NH_4)_2MoO_4$, etc.) and chlorides (e.g., $MoCl_3$, $MoCl_4$, etc.).

Cobalt oxides (e.g., CoO, $Co_2O_3$, $CoO_2$, $Co_3O_4$, etc.), cobalt salts (e.g., $CoCl_2$, $CoCl_2.6H_2O$, $Co(NO_3)_2.6H_2O$, $CoSo_4.7H_2O$, $Co(CH_3CO_2)_2.4H_2O$, $CoC_2O_4.2H_2O$, etc.), cobalt hydroxide ($Co(OH)_2$), and cobalt carbonate (basic cobalt carbonate), etc. are examples of operable cobalt compounds.

When adding nickel, nickel oxide (NiO), nickel salts (e.g., $NiCl_2$, $NiBr_2$, $NiI_2$ and the hydrates thereof Ni($NO_3$)$_2$.6$H_2O$, $NiSO_4.6H_2O$, $Ni(CH_3CO_2)_2.4H_2O$, $NiC_2O_4.2H_2O$, etc.), nickel hydroxide ($Ni(OH)_2$), nickel carbonate, and nickel acetylacetonate are used.

When adding tungsten, oxides (e.g., $WO_3$, $WO_2$, etc.), tungstic acid and the salts thereof (e.g., ammonium paratungstate, ammonium metatungstate, etc.) are used.

When adding copper, copper nitrate, copper chloride, copper acetate, copper sulfate, etc. are used. When adding boron, orthoboric acid, metaboric acid, ammonium metaborate, etc. are used, when adding phosphorus, oxides (e.g., $P_2O_5$), phosphoric acid and the salts thereof (e.g., orthophosphoric acid, metaphosphoric acid, pyrophosphoric acid, ammonium phosphorate, etc.) are used.

When adding titanium oxides (e.g., $TiO_2$, $Ti_2O_3$, TiO, etc.) chlorides (e.g., $TiCl_3$, $TiCl_4$, etc.), and sulfates (e.g., Ti(SO$_4$)$_2$, Ti(SO$_4$)$_3$, TiOSO$_4$, etc.) are used as the raw materials.

Also, as examples of compounds containing two or more additional catalytic component elements, there are, for example, titanium phosphate, phosphotungstic acid, phosphomolybdic acid, ammonium phosphomolybdate, etc.

The above-mentioned additional catalytic components can also be applied to the substrate by various prior-known supporting or compounding methods (see, "Catalyst Engineering Course", 10 edited by the Japanese Catalyst Society and "Catalyst Handbood", published by Chijin Shokan, 1967).

For example, in the case of supporting cobalt and molybdenum on the substrate, the method wherein definite amounts of cobalt and molybdenum are supported by immersing the molded substrate, after drying or calcining, in an aqueous ammonia solution of cobalt nitrate and ammonium molybdate is preferable, but other methods well known to persons skilled in the art, such as oxide mixing method, impregnation method, kneading method, ion exchange method, etc., may also be employed. Even if the starting materials and the preparation methods are different, the performance of the catalyst formed is almost the same so far as the catalyst contains definite amounts of the additional catalytic components.

In a different method of supporting an additional catalytic component on the substrate, the additional catalytic component can be supported on the substrate using a processing oil which was specifically prepared by adding a definite amount of an oil-soluble organic metal compound of the additional catalytic element to an organic medium oil such as hydrocarbon oils according to the above-described method of preparing VS$_x$ (in which an oil-soluble organic vanadium compound is used). Suitable oil-soluble compounds of the additional catalytic component metals may be selected from the following materials:

Halides oxyhalides, hydrated metal oxides, compounds such as heteropolyphosphoric acids (e.g., phosphomolybdic acid, etc.); metal salts of organic acids such as the metal salts of acyclic and alicyclic aliphatic carboxylic acid having 2 or more carbon atoms (e.g., naphthenic acid, etc.), aromatic carbonic acids (e.g., toluylic acid, etc.), sulfonic acids (e.g., toluenesulfonic acid, etc.), sulfinic acid, mercaptan, xanthogenic acid, phenol, and di- and polyhydroxy aromatic compounds; organic metal compounds such as the metal chelates with 1,3-diketone, ethylenediamine, ethylenediaminetetraacetic acid, phthalocyanine, etc.; and the metal salts of organic amines such as aliphatic amines, aromatic amines, and quaternary ammonium compounds.

The method of addition of these additional catalytic components is not critical. For example, VS$_x$ and the additional catalytic components can all be added at once to the substrate in such a way that about 50–500 ppm by weight each of molybdenum naphthenate and cobalt resinate are added to a heavy hydrocarbon oil containing large amounts of vanadium and sulfur (e.g., Venezuelan crude oil, etc.) and brought in contact with the substrate in the presence of a hydrogen-containing gas at a temperature of 350°–450° C., preferably 390°–420° C. and under a hydrogen pressure of 30–250 atm., preferably 80–160 atm.

By X-ray analysis, etc. of the catalysts prepared by the above-mentioned method, it has been confirmed that a portion of the additional catalytic components co-exists in the VS$_x$ phase. Also, by the X-ray diffraction, the catalysts show almost the same crystalline structure (V$_3$S$_4$ phase) regardless of the presence or absence of the additional catalytic component or components. In view of these facts, it is considered that these additional catalytic components, particularly, molybdenum, cobalt, nickel, copper, etc. can be supported on the substrate in which vanadium of VS$_x$ has been partially replaced by said metal element or the additional catalytic component may be present in the form of a solid structure with VS$_x$, without altering the crystalline structure of VS$_x$. In addition, it has further been confirmed that the VS$_x$ in the above-mentioned form is not harmful to the activity of the catalyst, so that the catalytic function of the additional catalytic component can be fully exhibited.

The use of the catalyst of this invention will now be explained.

The catalyst of this invention is very effective for the hydrotreatment of heavy hydrocarbon oils and, in particular, for cracking asphaltene and for the demetallization, desulfurization, and denitrification of such oils. Further, the catalyst of this invention is also a desirable catalyst for the hydrotreatment of heavy hydrocarbon oils to reduce Conradson carbon residue, to lower specific gravity, viscosity, and pour point of such oils, and to form light oils by cracking.

The catalytic hydrotreatment of heavy hydrocarbon oils using the catalyst of this invention can be performed in an ordinary flow type reaction system such as a fixed bed system, a moving bed system, a fluidized bed system or a ebullating bed system by suitably selecting the form, etc. of the catalyst, whereby the hydrotreatment can be achieved without the outflow of the catalyst accompanying the reaction product from the reaction zone.

The hydrotreatment of heavy hydrocarbon oils using the catalyst of this invention is carried out in the presence of the above-mentioned catalyst at a temperature of 350°–450° C., preferably 390°–420° C., under a pressure of 30–250 atm., preferably 80–180 atm., and with a liquid space velocity of 0.1–10 hr$^{-1}$, preferably 0.2–5 hr$^{-1}$.

Also, the mixing ratio of the processing hydrocarbon oil and the hydrogen or hydrogen-rich gas is 100–2,000 volumes (100–2,000 Nl/l), preferably 500–1,000 Nl/l of hydrogen at 15° C. per volume of the processing oil at 15° C. under one atmospheric pressure.

Substrate Preparation Method A (directly from natural minerals)

Sepiolite or attapulgite, which is a natural clay mineral having a double-chain structure, was calcined for 3 hours at 500° C. in air, followed by screening to 6–20 mesh, to obtain the following four substrates: (1) a substrate from clay-like sepiolite from Spain, (2) a substrate from fibrous sepiolite from Korea having high crystallinity, (3) a substrate from ferruginous sepiolite from Akan-machi, Hokkaido, Japan, in which a part of magnesium has been replaced by iron, and (4) a substrate from attapulgite commercially available from Engelhard Co. under the trade name, Sol Speedi Dri. The properties of the substrates are shown in Table 1.

TABLE 1

| Substrate | Properties of Substrates | | | |
|---|---|---|---|---|
| | (1) | (2) | (3) | (4) |
| Chemical composition | Sepiolite | Fibrous | Fer- | Attapul- |

TABLE 1-continued

| Substrate | Properties of Substrates | | | |
|---|---|---|---|---|
| | (1) | (2) | (3) | (4) |
| (wt.%) | from Spain | Sepiolite from Korea | ruginous Sepiolite from Japan | gite SSD (Engelhard Co.) |
| SiO$_2$ | 59.8 | 54.3 | 50.5 | 58.0 |
| MgO | 25.9 | 27.8 | 13.1 | 8.0 |
| Al$_2$O$_3$ | 2.6 | 2.7 | 5.9 | 9.3 |
| Fe$_2$O$_3$ | 0.7 | 2.3 | 8.7 | 3.0 |
| CaO | 0.5 | 3.0 | 1.3 | 2.0 |
| Physical properties* | | | | |
| Surface area (m$^2$/g) | 89 | 62 | 86 | 60 |
| Pore volume (cc/g) | 0.61 | 1.36 | 0.93 | 0.53 |
| Pore size distribution (cc/g) | | | | |
| 75–100 Å | 0.04 | 0.01 | 0.03 | 0.01 |
| 100–200 Å | 0.09 | 0.06 | 0.10 | 0.08 |
| 200–400 Å | 0.15 | 0.14 | 0.17 | 0.20 |
| above 400 Å | 0.34 | 1.15 | 0.63 | 0.24 |
| Average pore diameter Å | 181 | 877 | 432 | 355 |
| Bulk density (g/cc) | 0.15 | 0.31 | 0.41 | 0.61 |

*Unless otherwise indicated the data of the surface area, pore volume and average pore diameter in the examples are determined by mercury penetration method and all the data refer to the pore portions larger than 75Å in pore diameter.

Substrate Preparation Method B (molding)

Three kinds of raw-materials, i.e., the same sepiolite as used in preparing substrate (1) and the same attapulgite as used in preparing substrate (4), respectively, in Method A, and a powdery palygorskite from Syria were dried by hot air for 6 hours at about 120° C. and then molded by the procedure described below. Since the three kinds of raw materials were treating according to essentially the same procedure, the description will be given only in the case of sepiolite as a representative example.

The sepiolite mineral was ground in a ball mill for about 6 hours, and screened to about 50 mesh or finer and then 1.0 kg of the powder thus obtained was mixed with 1.5 kg of aqueous solution of aluminum hydroxide (concentration of 4.0% by weight as Al$_2$O$_3$) followed by thorough kneading in a kneading machine. It took about 6 hours for the viscosity of the mixture to become almost constant in the kneading. After the kneading, the mixture was extrusion-molded into an extrudate form of 0.8 mm diameter under a pressure of about 30 atm. and then the molding thus obtained was air dried overnight at room temperature, further dried by hot air for 6 hours at about 120° C., and then calcined at 500° C. for 3 hours in an air to provide a substrate (5).

In the same manner as above, substrate (6) was obtained from the attapulgite and substrate (7) from the palygorskite.

The properties of the moldings thus obtained, i.e., substrate (5), substrate (6) and substrate (7), are shown in Table 2.

TABLE 2

| Substrate | Properties of Molded Substrates | | |
|---|---|---|---|
| | (5) | (6) | (7) |
| Surface area (m$^2$/g) | 126 | 86 | 84 |
| Pore volume (cc/g) | 0.83 | 0.59 | 0.56 |
| Pore size distribution (cc/g): | | | |
| 75–100 Å | 0.04 | 0.03 | 0.03 |
| 100–200 Å | 0.16 | 0.11 | 0.09 |
| 200–400 Å | 0.25 | 0.21 | 0.23 |
| above 400 Å | 0.37 | 0.24 | 0.21 |
| Average pore diameter (Å) | 247 | 278 | 268 |
| Crushing strength (kg/5mm) | 4.3 | 4.4 | 4.6 |

TABLE 2-continued

| Substrate | Properties of Molded Substrates | | |
|---|---|---|---|
| | (5) | (6) | (7) |
| Bulk density (g/cc) | 0.45 | 0.54 | 0.59 |

As is clear from Table 2, the pore diameter, the surface area of the pores above 75 Å in diameter, and the pore volumes of substrate (5) and substrate (6) are larger than those of substrate (1) and substrate (4), respectively. Also, the crushing strength in the diametral direction of the three molded substrates is much greater than 1 kg/5 mm.

Substrate Preparation Method C (Preparation of substrates having different physical properties from the same raw material)

Using the dry powder finer than about 50 mesh of the sepiolite as used in Method B, two kinds of molded substrates having physical properties different than those of substrate (5) were prepared by the following procedures.

(C-1) In the same procedure as Method B except that the concentration (6.7% by weight as Al$_2$O$_3$) and the quantity (0.9 kg per 1.0 kg of sepiolite powder) of the aqueous aluminum hydroxide solution added were varied and adding an additional step of precalcining the powder for 3 hours in air of 200° C. prior to the final calcination, there was obtained substrate (8).

(C-2) Method B was followed, but instead of the kneading step, about 1 liter of distilled water was added to 100 g of the sepiolite powder and the mixture was stirred vigorously for about 30 minutes to form a gel.

Then, 1 liter of aqueous aluminum hydroxide solution (concentration of 0.6% by weight as Al$_2$O$_3$) was further added to the gel, followed by stirring for about 10 minutes, and by subjecting the mixture to filtration and dehydration in a reduced pressure filter, 336 g of cake was obtained. After the cake was molded as in Method B, the wet molded cake was directly calcined for 3 hours in air of 500° C. omitting the air drying and predrying, unlike the case of substrate (5), to provide substrate (9).

The physical properties of substrate (8) and substrate (9) are shown in Table 3.

TABLE 3

| Substrate | (8) | (9) |
|---|---|---|
| Characteristic step in preparation | slow calcination at low water content | quick calcination at high water content |
| Surface area (m$^2$/g) | 147 | 109 |
| Pore volume (cc/g) | 0.75 | 1.10 |
| Pore size distribution (cc/g): | | |
| 75–100 Å | 0.06 | 0.04 |
| 100–200 Å | 0.24 | 0.11 |
| 200–400 Å | 0.32 | 0.19 |
| above 400 Å | 0.13 | 0.76 |
| Average pore diameter (Å) | 204 | 401 |
| Crushing strength (kg/5mm) | 4.5 | 2.8 |
| Bulk density (g/cc) | 0.52 | 0.43 |

Substrate Preparation Method D (molded into a cylindrical form)

Following the same procedure as Method B, except that the circular die 0.8 mm in diameter used in the preparation of substrate (5) was replaced by a die having a doughnut like opening of 1.0 mm outside diameter and 0.2 mm inside diameter, hollow cylindrical (macaroni-shaped) substrate (10) was obtained. The physical properties of the substrate thus obtained are shown in Table 4.

TABLE 4

Properties of Cylindrical Substrate

| Substrate | (10) |
|---|---|
| Surface area (m²/g) | 88 |
| Pore volume (cc/g) | 0.74 |
| Pore size distribution (cc/g): | |
| 75–100 Å | 0.02 |
| 100–200 Å | 0.04 |
| 200–400 Å | 0.28 |
| above 400 Å | 0.40 |
| Average pore diameter (Å) | 240 |
| Crushing strength (kg/5mm) | 3.0 |
| Bulk density (g/cc) | 0.47 |

In order to explain the invention more fully some examples are set forth below. It is to be understood, however, that these examples are presented for clarifying the spirit of this invention and are not intended to limit the invention in any way.

These examples show the various processes for preparation of the catalysts of this invention by supporting $VS_x$ on the substrates prepared by the various methods described above, the processes of supporting the additional catalytic components on these substrates and moreover the effects of the catalysts of this invention.

EXAMPLE 1

Process 1 for supporting $VS_x$ on substrate (by heavy hydrocarbon oil)

Substrate (1) was packed in an ordinary fixed bed type catalytic reaction vessel and a Venezuelan heavy crude oil (hereinafter, referred to as oil (I)) containing a large amount of vanadium as shown in Table 5 was passed through the reaction vessel under the processing conditions of 405° C. temperature, 140 kg/cm²G pressure, 0.8 hr⁻¹ liquid space velocity, and 1,000 Nl/l $H_2$/oil ratio. Thus, by varying the processing time to 60, 100, 200, 300, and 400 hours in the above processing step, catalysts each having a different amount of vanadium supported were prepared. The amount of vanadium, nickel and sulfur supported on these catalysts are shown in Table 6.

TABLE 5

Properties of Oil (I)

| Specific gravity (D 15/4°C.) | 1.004 |
|---|---|
| Asphaltene content (wt. %) | 11.8 |
| Sulfur content (wt. %) | 5.4 |
| Vanadium content (ppm) | 1240 |
| Nickel content (ppm) | 106 |

TABLE 6

Amount of Metals (vanadium and nickel) and Sulfur Supported on Substrate (1)

| Catalyst | (a) | (b) | (c) | (d) | (e) |
|---|---|---|---|---|---|
| Processing time (hr) | 60 | 100 | 200 | 300 | 400 |
| Supported vanadium (weight %/substrate) | 2 | 9 | 29 | 43 | 61 |
| Supported nickel (weight %/substrate) | 0.5 | 2 | 3 | 4 | 6 |
| Supported sulfur (weight %/substrate) | 2 | 10 | 26 | 38 | 54 |
| Supported carbon (weight %/substrate) | | | | | 20 |

The powder X-ray diffraction patterns of these catalysts showed the presence of vanadium sulfide in the $V_3S_4$ phase and, for example, as shown in FIG. 1 of the accompanying drawings, a small amount of accumulation of vanadium (Catalyst (c)) showed the low crystallinity in the upper pattern, while a large amount of accumulation of vanadium (Catalyst (e)) showed the medium crystallinity in the lower pattern.

Figure 2:
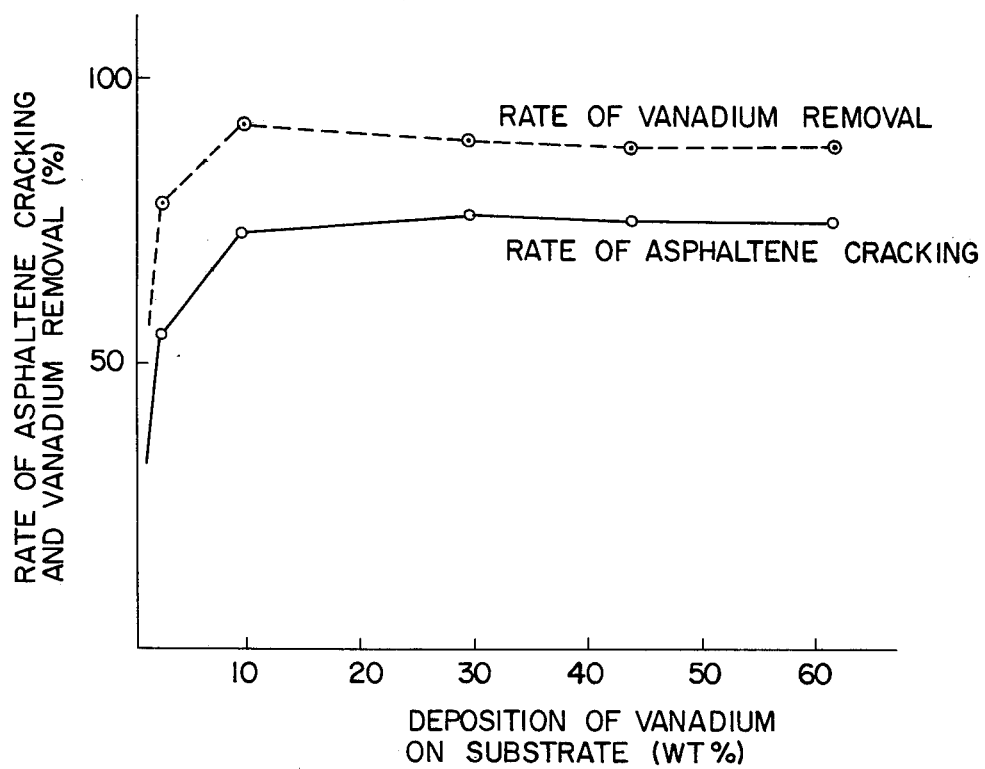
FIG. 2 and FIG. 8 are graphs showing the relationship between the amount of vanadium accumulated and the rate of cracking of asphaltene as well as the rate of vanadium removal.

Furthermore, FIG. 2 shows the relation between the amount of vanadium accumulated on these substrates and the cracking rate of asphaltene and the vanadium removal rate in the treated oil.

From these results, it is found that a sufficient catalytic activity is developed by accumulating more than 2% by weight of vanadium on the substrate.

The analysis of asphaltene in the feed oil and the product oil was performed according to the standard method of the Institute Petroleum Great Britain IP 143/57.

The identification of X-ray diffraction spectra of vanadium sulfide was made according to the method described in A. B. de Vries, F. Jellinek, "Rev. Chim. Miner.", Vol. 11, 624–636 (1974).

EXAMPLE 2

Figure 3:
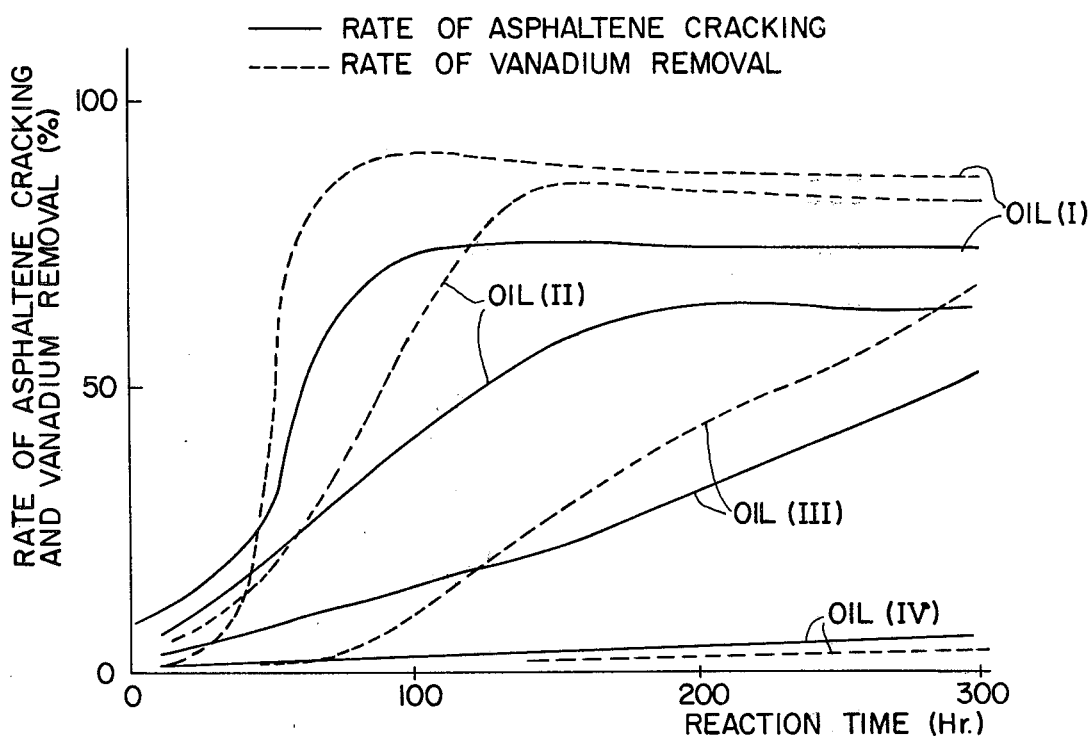
FIGS. 3, 4, 5, 6 and 7 are graphs showing variations in the rate of cracking of asphaltene and the rate of vanadium removal with the passage of time of processes described in the examples.

In order to clarify the relationship between the vanadium content of a heavy hydrocarbon oil and the occurrence of catalytic activity, substrate (1) was processed by each of oils (I), (II), (III) and (IV) shown in Tables 5 and 7 under the same reaction conditions using the same apparatus as in Example 1. In FIG. 3 are shown the cracking rate of asphaltene and the vanadium removal rate versus the time of oil pass. As is clear from the results, while the substrate per se minimally possessed activity for the cracking of asphaltene and vanadium removal in the initiation of processing, the activity began to develop gradually with the time of oil pass, and thus, it was brought to light that with oil (I) a stable activity was obtained after about 80 hours, and with oils (II) and (III) the substrates could be activated to a considerable extent after about 160 hours with the former and after about 300 hours with the latter. However, with oil (IV), there was no catalytic activity even after 300 hours.

In view of these results, it is clear that by treating sepiolite minerals with a heavy hydrocarbon oil containing a large amount of vanadium, the activation of the substrate can be achieved in a short period of time.

TABLE 7

Properties of Heavy Hydrocarbon Oils

| Oil | (II) Venezuelan atmospheric residual oil | (III) Vacuum residual oil | (IV) of Near Middle East |
|---|---|---|---|
| Specific gravity (D 15/4° C.) | 1.022 | 1.051 | 1.025 |
| Viscosity (c.p. 100 C) | 200 | 3575 | 1549 |
| Asphaltene content (wt. %) | 14.1 | 16.1 | 11.1 |
| Conradson carbon residue (wt. %) | 15.9 | 21.6 | 21.2 |
| Sulfur content (wt. %) | 3.9 | 6.1 | 4.9 |
| Nitrogen content (wt. %) | 0.59 | 0.63 | 0.36 |
| Vanadium content (ppm) | 478 | 211 | 128 |
| Nickel content (ppm) | 107 | 71 | 43 |
| Pour point (°C.) | >40 | 4.5 | >40 |

The elemental analysis of the substrate which was treated with oil (IV) for 300 hours is shown in Table 8.

TABLE 8

| Amount accumulated on Substrate (1) | |
| --- | --- |
| Vanadium (wt. %/substrate) | 1.2 |
| Sulfur (wt. %/substrate) | 4.4 |
| Carbon (wt. %/substrate) | 49.5 |

From the above result, it is understood that the amounts of the vanadium and sulfur accumulated on the substrate are very small while the amount of carbon deposited is very high. Therefore, it appears that in oil (IV) having a vanadium content of less than 200 ppm, no effective activation is achieved because the surface of the substrate is poisoned by carbon.

Also, as is clear from the comparison of the analysis of the active catalyst (d) shown in Table 6 of Example 1 with that of Table 8, the vanadium sulfide accumulated on the substrate has not only an activity for asphaltene cracking and vanadium removal but also an action of suppressing the deposition of coke on the catalyst.

From the above results, it is clear that the source showing activity by accumulation on the substrate is vanadium sulfide. Also, even when the accumulation increases the activity is maintained high, so that the catalytic method of the process of this invention is effective for asphaltene cracking and metal removal in the hydrotreatment of heavy hydrocarbon oils. In addition, when the treated oil was separated by filtration into the oil portion and the remainder and the latter was washed with benzene, only a trace of insoluble matter was observed. Therefore, it is considered that the product oil contained almost no metal compounds and substantially all the heavy metals removed from the heavy hydrocarbon oil were accumulated on the substrate.

EXAMPLE 3

In order to investigate the effect of treatment conditions in the activation of the substrate, substrate (1) of Table 1 was treated under the conditions of (ii) to (v) shown below in Table 9 with oil (I) in the same apparatus as employed in Example 1. The properties of the treated oil after 100 hours from the initiation of the treatment are shown in Table 10.

TABLE 9

| | Processing Conditions | | | | | |
| --- | --- | --- | --- | --- | --- | --- |
| | (i) | (ii) | (iii) | (iv) | (v) | (vi) |
| Reaction temp. (°C.) | 405 | 300 | 405 | 460 | 405 | 405 |
| Reaction press. (atm.) | 140 | 140 | 140 | 140 | 20 | 140 |
| LHSV (hr$^{-1}$) | 0.8 | 1.5 | 1.5 | 1.5 | 1.5 | 0.3 |
| H$_2$/oil ratio (Nl/l) | 1,000 | 1,000 | 1,000 | 1,000 | 1,000 | 1,000 |

TABLE 10

| | Properties of Treated Oils | | | |
| --- | --- | --- | --- | --- |
| Processing condition | (ii) | (iii) | (iv) | (v) |
| Specific gravity (D 15/4° C.) | 1.003 | 0.975 | Oil pass became impossible after about 40 hours | Oil pass became impossible after about 70 hours |
| Asphaltene content (wt. %) | 11.6 | 6.0 | | |
| Vanadium content (ppm) | 1200 | 370 | | |
| Nickel content (ppm) | 95 | 53 | | |

As is clear from the above results, under condition (ii) in which the reaction temperature was about 300° C., the vanadium removal reaction and the asphaltene cracking occurred only minimally but under condition (iv) in which the temperature was high, the pressure drop in the reactor became as high as 5 atms. or more at about 40 hours of oil pass and thereafter the oil pass became impossible. Also, even when the treatment was carried out under condition (v) in which the hydrogen pressure was as low as 20 atms., the pressure drop in the reactor became higher than 5 atms. after about 70 hours and thereafter the oil pass became impossible. The substrates used were recovered and the accumulations were analyzed with the results being those shown in Table 11.

As is clear from Table 11, the deposition of vanadium on the substrate under condition (ii) could be hardly observed.

On the other hand, under condition (iv) or (v) the deposition of vanadium occurred, but more plugging of the catalyst bed was caused by coking than under condition (iii).

TABLE 11

| | Accumulation on Substrate (1) | | | |
| --- | --- | --- | --- | --- |
| Processing condition | (ii) | (iii) | (iv) | (v) |
| Vanadium (wt. %/substrate) | 0.1 | 9.1 | 18.1 | 3.8 |
| Sulfur (wt. %/substrate) | trace | 8.8 | 16.7 | 3.2 |
| Carbon (wt. %/substrate) | 0.3 | 23.5 | 55.3 | 51.1 |

EXAMPLE 4

Process 2 for supporting VS$_x$ on substrate by non-oily solvent containing soluble vanadium compound In 140 ml of distilled water was dissolved 21.9 g of vanadyl sulfate VOSO$_4$.xH$_2$O (supplied by Wako Junyaku K. K.) and after adding 100 g of substrate (5) to the solution, the system was allowed to stand overnight. Thereafter, the mixture was evaporated to dryness at about 100° C. and further dried for 6 hours at 120° C. The resulting product was maintained at 300° C. for about 20 hours in a current of H$_2$S, and then further maintained for 3 hours at an elevated temperature of 450° C. to provide catalyst (f) which contained VS$_x$ supported in an amount shown in Table 14.

TABLE 14

| Amount of VS$_x$ supported on substrate (5) from non-oily solvent containing oilsoluble vanadium compound | |
| --- | --- |
| Catalyst | (f) |
| Vanadium supported (wt. %/substrate) | 4.2 |
| Sulfur supported (wt. %/substrate) | 3.8 |

EXAMPLE 5

Process for supporting an additional catalytic component by supporting Co-Mo on substrate beforehand The 400 ml of hot water was added 151.9 g of ammonium molybdate and then, after an aqueous solution of 160.5 g of cobalt nitrate in 400 ml of distilled water was added thereto and mixed, 500 ml of 25 wt. % aqueous ammonia was further added to the mixture. From the solution thus obtained 350 ml was taken and diluted with 50 ml of distilled water and then 500 g of substrate (5) was uniformly impregnated by spraying with the diluted solution, allowed to stand overnight in a hermetically sealed state, and air-dried at room temperature. The substrate was further dried by hot air for 3 hours at 120° C. and finally calcinated for 3 hours in air at 500° C. to provide substrate (11) containing additional components.

The substrate (11) thus prepared contained 1.9% by weight of cobalt as CoO and 6.9% by weight of molybdenum as $MoO_3$.

EXAMPLE 6

Process for supporting an additional catalytic component by supporting copper on substrate beforehand The intermediate product which was obtained before substrate (5) was calcined at 500° C. in the final step in Substrate Preparation Method B was calcined for 3 hours in air at 200° C. and 100 g of the product was immersed in 500 ml of an aqueous solution of copper nitrate (pH 3.0) containing 0.5 mole/liter of $Cu^{2+}$. After maintaining the system for 3 hours at about 60° C., the substrate was withdrawn from the aqueous solution and washed repeatedly with distilled water of about 60° C. until the coloration of the washing by $Cu^{2+}$ ion became indiscriminative. Thereafter, the substrate was dried by hot air for 6 hours at 120° C. and than calcined for 3 hours in air at 500° C. to provide substrate (12) containing the additional component. The amount of copper supported on the substrate thus prepared was 1.9% by weight as metal.

EXAMPLE 7

Process for supporting an additional catalytic component by addition of boric acid In a solution of 15.4 g of boric acid ($H_3BO_3$) dissolved in one liter of distilled water was immersed at about 80° C. 100 g of cobalt-and-molybdenum-supported substrate (11) which was prepared by the above-described process of Example 5. After allowing the system to stand for about one hour, it was evaporated to dryness and calcined for 3 hours in air at 500° C. to provide substrate (13) containing the additional component. The amount of boron supported on the substrate thus prepared was 7.5% by weight as $B_2O_3$.

EXAMPLE 8

Process 3 for supporting $VS_x$ on substrate containing additional catalytic components supported beforehand Substrates (11), (12) and (13) prepared in Example 5, 6 and 7, respectively, were treated for about 80 hours under the same conditions and using the same oil as in Example 1 to provide catalysts (g), (h) and (i) respectively.

By their powder X-ray diffraction, it was confirmed that all of these catalysts show the presence of the $V_3S_4$ phase.

The amounts of metals, boron, and sulfur supported in the catalysts thus prepared are shown in Table 15.

TABLE 15

| Catalysts | (g) | (h) | (i) |
|---|---|---|---|
| Vanadium (wt. %/substrate) | 13 | 10 | 14 |
| Nickel (wt. %/substrate) | 1 | 1 | 2 |

TABLE 15-continued

| Catalysts | (g) | (h) | (i) |
|---|---|---|---|
| Molybdenum (wt. %/substrate) | 5 | — | 5 |
| Cobalt (wt. %/substrate) | 1 | — | 1 |
| Copper (wt. %/substrate) | — | 2 | — |
| Boron (wt. %/substrate) | — | — | 2 |
| Sulfur (wt. %/substrate) | 17 | 11 | 18 |

EXAMPLE 9

Process 4 for simultaneously supporting $VS_x$ and additional catalytic components on substrate Substrate (5) was treated for 100 hours under the same conditions as in Example 1. The heavy hydrocarbon oil used in this case was prepared by dissolving molybdenum resinate (No. 8605, supplied by Engelhard Co.) in oil (I) so that it contained a molybdenum content of 500 ppm by weight. The amounts of metals and sulfur supported in catalyst (j) thus prepared are shown in Table 16.

TABLE 16

| Amounts of metals and sulfur supported on substrate (5) | |
|---|---|
| Catalyst | (j) |
| Vanadium (wt. %/substrate) | 16 |
| Molybdenum (wt. %/substrate) | 8 |
| Nickel (wt. %/substrate) | 2 |
| Sulfur (wt. %/substrate) | 19 |

EXAMPLE 10

Hydrotreatment of heavy hydrocarbon oil $VS_x$-supported catalysts (a), (b), (c), (d) and (e) as shown in Table 6 of Example 1 were packed in an ordinary fixed bed reactor and the hydrotreatment of the Venezuelan heavy hydrocarbon oil having the properties as shown in Table 5 of Example 1 was carried out under reaction condition (i) described in Table 9 of example 3. After about 5 hours, the product oil was analyzed, with the results being shown in Table 17.

TABLE 17

| | Properties of Product Oils | | | | |
|---|---|---|---|---|---|
| Catalyst | (a) | (b) | (c) | (d) | (e) |
| Asphaltene content (wt. %) | 5.3 | 3.1 | 2.5 | 2.6 | 2.7 |
| Vanadium content (ppm by wt.) | 248 | 99 | 124 | 136 | 136 |
| Sulfur content (wt. %) | 4.2 | 3.2 | 3.1 | 3.2 | 3.2 |

From these results, it is understood that when $VS_x$ is supported on the substrate in an amount over about 2% by weight as vanadium, sufficient catalytic activity is obtained but when the content of vanadium exceeds about 20% by weight, the catalytic activity is almost no longer improved.

EXAMPLE 11

Hydrotreatment of heavy hydrocarbon oil

Figure 4:
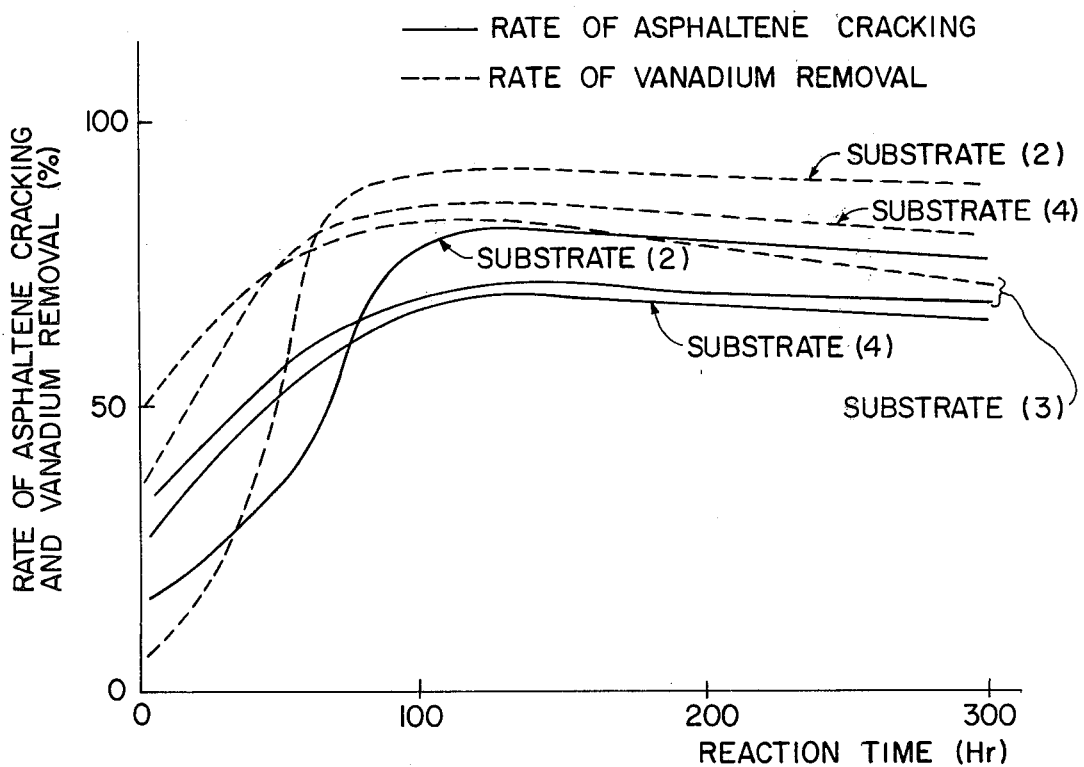

Using substrates (2), (3) and (4) having the properties as shown in Table 1 prepared in Substrate Preparation Method A described before, the deposition of $VS_x$ on the substrate and the subsequent hydrotreatment of oil (I) were carried out under the same conditions as in Example 1. The changes in the asphaltene cracking rate and the vanadium removal rate with the passage of time are shown in FIG. 4. From these results, it will be understood that the catalysts containing $VS_x$ supported on the clay minerals having a double-chain structure are effective for the hydrotreatment of heavy hydrocarbon oils, such as asphaltene cracking and metal removal.

EXAMPLE 12

Hydrotreatment of heavy hydrocarbon oil

Figure 5:
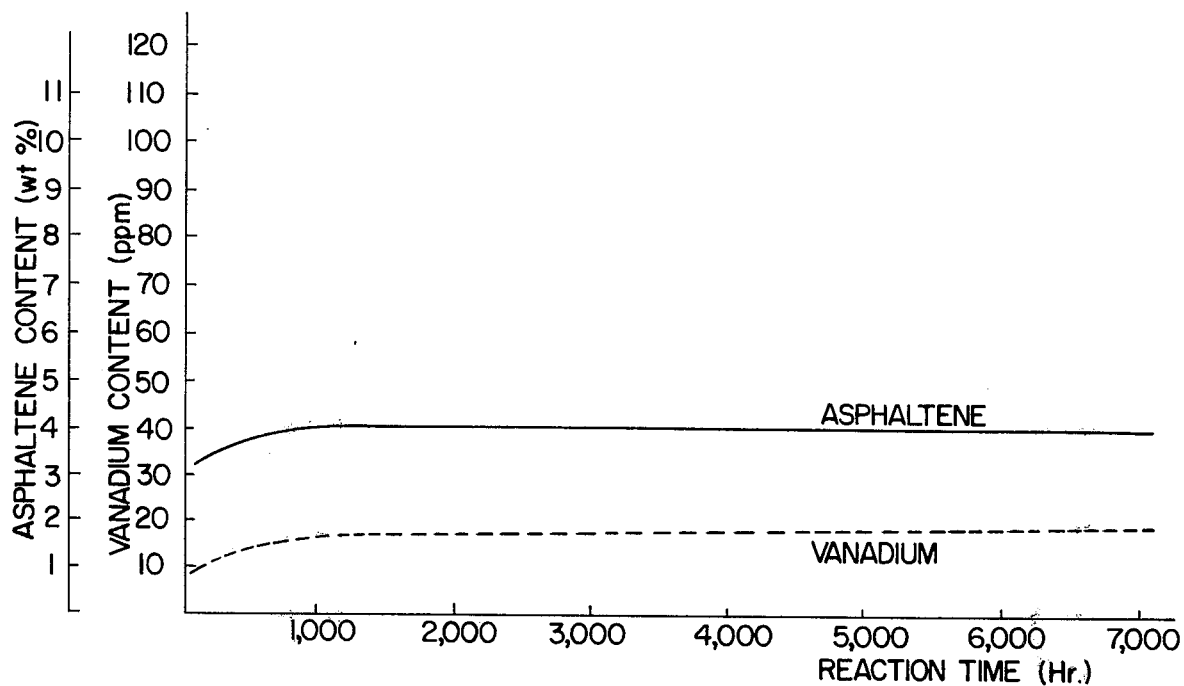

Using catalyst (b) (containing $VS_x$ supported in an amount shown in Table 6) prepared in Example 1, the hydrotreatment of the vacuum residual oil from Near Middle East shown as oil (IV) in Table 7 of Example 2 was carried out under the reaction condition (vi) in Table 9 of Example 3. The changes in the contents of asphaltene and vanadium in the product oil with the passage of time are shown in FIG. 5. As is clear from the results, the catalyst containing $VS_x$ supported on a clay mineral having a double-chain structure is also effective for the hydrotreatment of a heavy hydrocarbon oil containing a comparatively small amount of vanadium and exhibits a high activity for asphaltene cracking and vanadium removal as well as maintaining a stable activity for a long period of time.

EXAMPLE 13

Hydrotreatment of heavy hydrocarbon oil

Using molded substrate (5) (having the properties shown in Table 2), substrate (8), and substrate (9) (having the properties shown in Table 3), which were prepared from a sepiolite mineral from Spain in Substrate Preparation Methods B and C described above, the supporting of $VS_x$ on the substrate and the subsequent hydrotreatment were carried out with the Venezuelan heavy crude oil (oil (I)) under the reaction conditions shown in the following Table 18.

TABLE 18

| Reaction conditions | |
|---|---|
| Reaction temperature | 405° C. |
| Reaction pressure | 140 atm. |
| LHSV | 1.0 hr$^{-1}$ |
| H$_2$/oil ratio (Nl/l) | 1,000 |

Figure 6:
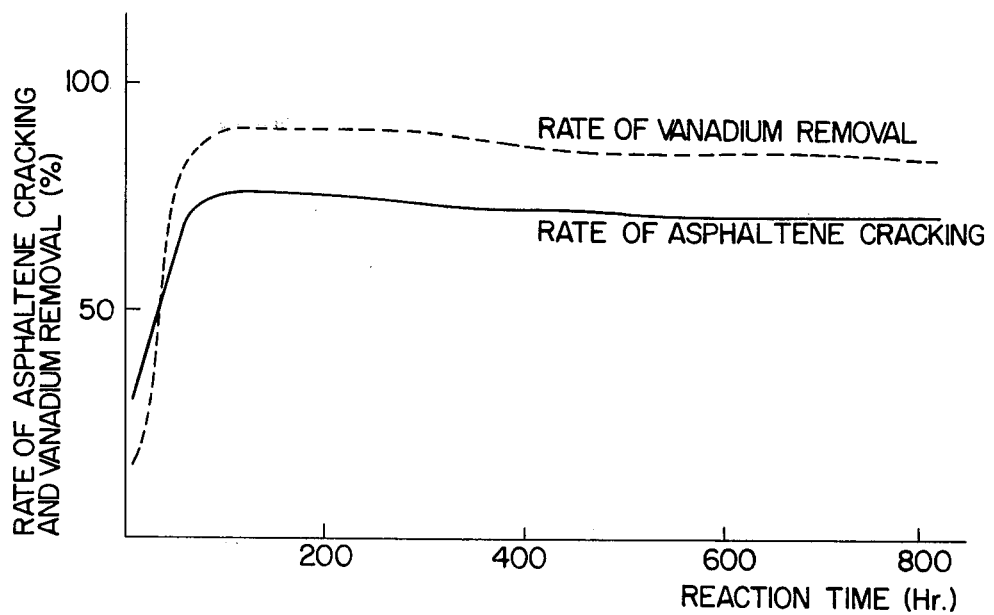

The changes in asphaltene cracking rate and vanadium removal rate with the passage of time when using substrate (5) are shown in FIG. 6.

From these results, it is found that substrate (5) can be more easily activated than substrate (1) shown in FIG. 3, and that a lowering in activity hardly occurs with substrate (5) even when the oil is passed for about 900 hours. By the analysis of the catalyst used it was confirmed that the amount of vanadium accumulated exceeds 150 wt.% as shown in Table 19. It is also confirmed that when using a substrate whose pore structure has been improved by molding a natural sepiolite, the activation treatment of this invention can be more effectively achieved.

TABLE 19

| Accumulation on Substrate (5) | |
|---|---|
| Vanadium (wt. %/substrate) | 151 |
| Sulfur (wt. %/substrate) | 133 |
| Carbon (wt. %/substrate) | 30 |

Figures 1, 7:
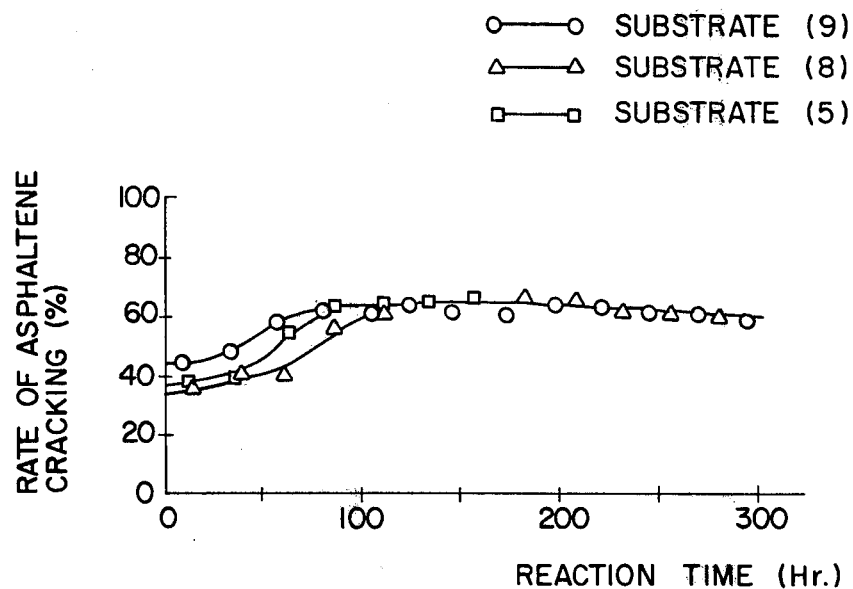
Figures 2, 7:
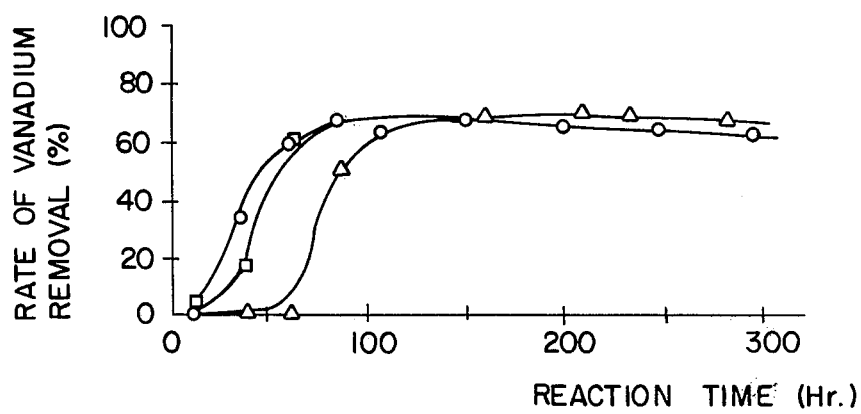

Furthermore, the changes in asphaltene cracking rate and vanadium removal rate with the passage of time that are found in the case of substrates (5), (8), and (9) are shown in FIGS. 7-1 and 7-2. Also, when the oil thus produced was separated by filtration into the oil portion and the remainder and the remainder was washed with benzene, no insoluble matter was observed, so that it is considered that the product oil contained almost no metal compounds indicating that substantially all the heavy metals removed from the heavy hydrocarbon oil accumulated on the substrate. Thus, this enables calculation of the mean amount of vanadium accumulated on the whole substrate from the vanadium removal rate. The changes in asphaltene cracking rate and vanadium removal rate accompanying the mean amount of vanadium accumulated on the substrate are shown in FIGS. 8-1 and 8-2.

Figures 1, 8:
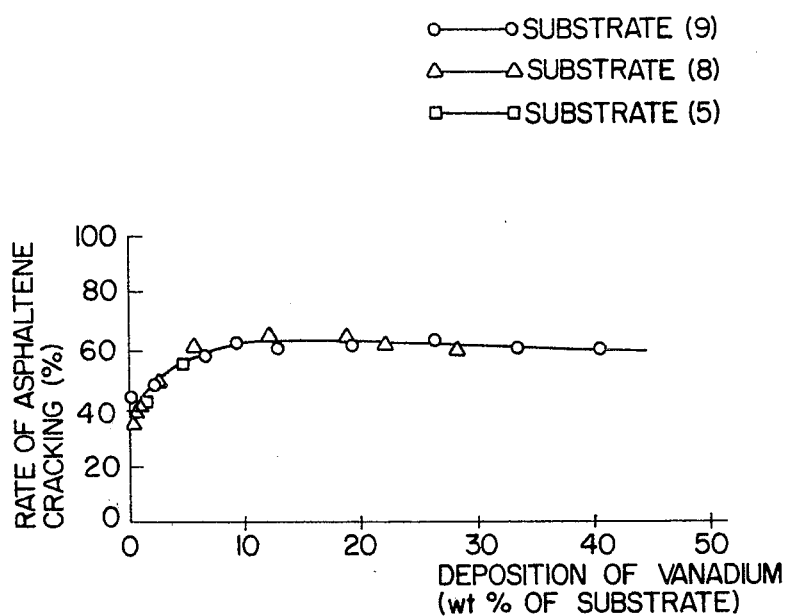
Figures 2, 8:
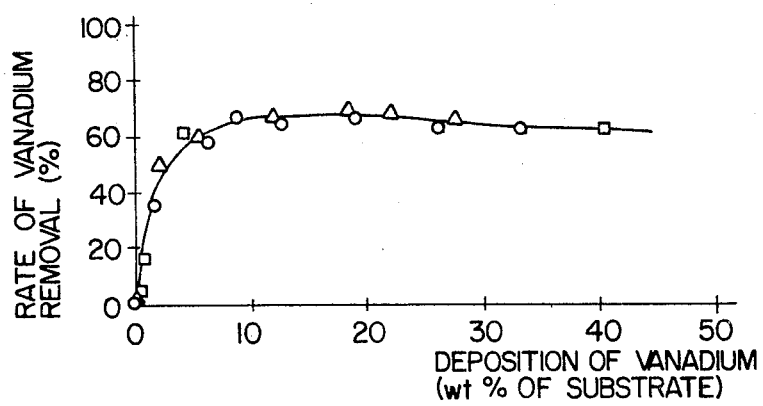

As is clear from FIG. 8-2, the catalyst showed almost no activity toward the vanadium removal reaction at the beginning of the reaction but the activity began to develop with the passage of time becoming almost constant after about 100 hours. However, the course of development the catalytic activity differs according to the kind of substrate and the larger the volume of the pores larger than 400 A in pore diameter in the substrate the faster the activity tends to develop.

Also, as is clear from FIGS. 8-1 and 8-2, every substrate shows the same catalytic activity after a definite amount of $VS_x$ has once been supported thereon.

EXAMPLE 14

Hydrotreatment of heavy hydrocarbon oil

Using catalyst (f) of Example 4 and catalysts (g), (h) and (i) each containing additional catalytic components of Example 8, the vacuum residual oil from Near Middle East having the properties of oil (IV) shown in Table 7 was subjected to hydrotreatment under the reaction conditions shown in Table 20 below. The properties of the oil thus processed for about 1,000 hours are shown in Table 21.

As is clear from these results, catalysts (f), (g), (h) and (i) are effective for asphaltene cracking and metal removal. Especially, desulfurization activity of catalyst (g) containing Co and Mo as the additional components is advanced and also catalyst (i) containing B is improved for nitrogen and Conradson carbon residue (CCR) reduction. In any case, light fractions are obtained, of which specific gravity, viscosity and pour point of product oils are effectively lowered and therefore quality is high.

TABLE 20

| | |
|---|---|
| Reaction temperature | 420° C. |
| Reaction pressure | 140 atm. |
| LHSV | 0.2 hr$^{-1}$ |
| H$_2$/oil ratio (Nl/l) | 1,000 |

TABLE 21

| | Properties of Product Oils | | | |
|---|---|---|---|---|
| Catalyst | (f) | (g) | (h) | (i) |
| Asphaltene content (wt. %) | 3.4 | 3.3 | 4.3 | 3.0 |
| Conradson carbon residue (wt. %) | 11.3 | 10.6 | 11.0 | 7.5 |
| Sulfur content (wt. %) | 2.3 | 1.4 | 1.8 | 1.3 |
| Nitrogen content (wt. %) | 0.34 | 0.31 | 0.34 | 0.18 |
| Vanadium content (ppm) | 3.0 | 2.9 | 2.9 | 2.9 |
| Nickel content (ppm) | 8.1 | 7.6 | 7.5 | 5.0 |
| Specific gravity (D 15/4° C.) | 0.947 | 0.940 | 0.946 | 0.937 |
| Viscosity (c.p. 50° C.) | 60 | 50 | 56 | 47 |
| Pour point (°C.) | −20 | −23 | −21 | −27 |

COMPARISON EXAMPLE

Preparation of Co-Mo-supported alumina catalyst

A Co-Mo alumina catalyst was prepared by the following process similar to the process disclosed in Japanese Patent Publication No. 20,911/71.

In 20 liters of water was dissolved 4730 g of $AlCl_3 \cdot 6H_2O$ and then 500 g of glacial acetic acid was added to the solution. On the other hand, 4 liters of ammonium hydroxide (aqueous 28% $NH_3$ solution) was mixed with 10 liters of water and the mixture was continuously and slowly added to the $AlCl_3$ solution prepared above until the pH became 8. The slurry thus formed was filtered and the remainder on the filter was washed with an aqueous solution containing 1 g of ammonium acetate per liter of water until the washings showed almost no white turbidity when mixed with an aqueous silver nitrate solution. Then, the filter cake was extrusion-molded to a diameter of 0.8 mm, dried at 120° C., and calcined for 16 hours at 540° C. to provide an active alumina substrate.

By supporting cobalt and molybdenum on this substrate by the same procedure as when substrate (11) was obtained, catalyst (k) was prepared. The properties of this catalyst are shown in Table 22.

TABLE 22

| Properties of Co—Mo—Alumina Catalyst (k) | |
|---|---|
| Chemical composition: | |
| $Al_2O_3$ (wt. %) | 78.4 |
| $MoO_3$ (wt. %) | 15.0 |
| CoO (wt. %) | 4.1 |
| $SiO_2$ (wt. %) | 0.3 |
| MgO (wt. %) | — |
| Physical properties: | |
| Surface area (m²/g) | 154.5 |
| Pore volume (cc/g) | 0.601 |
| Pore size distribution (cc/g): | |
| 0–100 Å | 0.024 |
| 100–200 Å | 0.499 |
| 200–300 Å | 0.058 |
| 300–600 Å | 0.020 |

Next, for comparing the catalyst (k), which was prepared as above as the typical catalyst used in a conventional fixed bed-type hydrotreatment, with the Co-Mo supported substrate (11) of this invention having the properties shown in Table 23 which was obtained in Example 5, the following experiment was carried out. The oil (I) containing large amounts of asphaltene and heavy metals was used as the feed oil.

The experimental apparatus used was the above-mentioned fixed bed type isothermal reactor of gas-liquid parallel upflowing current and the reaction conditions employed were as shown in (vi) of Table 9.

Figure 9:
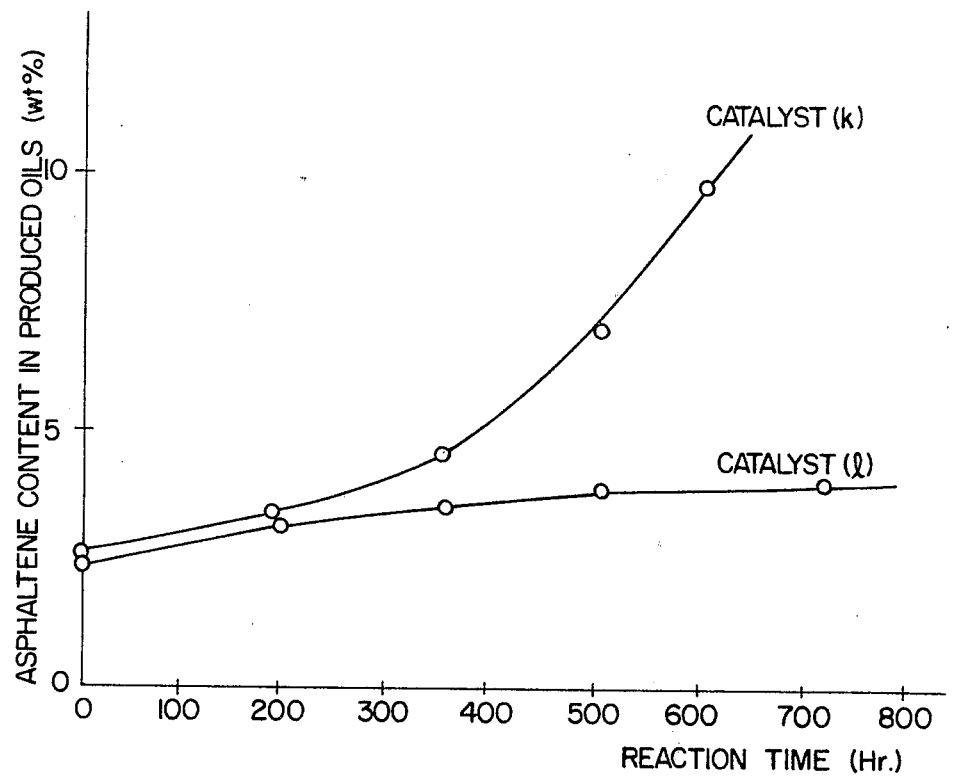
FIG. 9 is a graph showing the variation in the content of asphaltene and vanadium in oil subjected to the hydrotreatment with the passage of time.

The results are shown in FIG. 9, from which it is clear that when catalyst (k) is used, the activity of the catalyst decreases remarkably.

TABLE 23

| Properties of Substrate (11) | |
|---|---|
| Chemical composition: | |
| $Al_2O_3$ (wt. %) | 5.5 |
| $MoO_3$ (wt. %) | 6.9 |
| CoO (wt. %) | 1.9 |
| $SiO_2$ (wt. %) | 48.8 |
| MgO (wt. %) | 18.6 |
| Physical properties: | |
| Surface area (m²/g) | 171 |
| Pore volume (cc/g) | 0.79 |

TABLE 23-continued

| Properties of Substrate (11) | |
|---|---|
| Pore size distribution (cc/g): | |
| 0–100 Å | 0.031 |
| 100–200 Å | 0.094 |
| 200–400 Å | 0.387 |
| 400–600 Å | 0.278 |

When substrate (11) is used, vanadium and sulfur in the oil are accumulated as $VS_x$ on the substrate to form the catalyst (l) of this invention composed of $VS_x$-Co-Mo-sepiolite as the reaction proceeds, and the catalyst thus formed develops the activity for asphaltene cracking which is maintained for a long period of time. On the other hand, when catalyst (k) is used, there is found a rapid decrease in the catalytic activity due to vanadium.

As is clear from the above Comparison Example, it will be well understood that the catalyst of this invention is remarkably superior, from the economical viewpoint, as a practical catalyst for the hydrotreatment of heavy hydrocarbon oils as compared to a conventional catalyst for hydrotreatment used in a fixed bed system, etc.

Furthermore, the properties of the oil obtained after 180 hours of oil pass were compared with the consumption of hydrogen with the result being shown in Table 24.

TABLE 24

| Comparison of Properties of Product Oils with Consumption of Hydrogen | | |
|---|---|---|
| Catalyst | (l) | (k) |
| Asphaltene content (wt. %) | 3.1 | 3.2 |
| Vanadium content (ppm) | 70 | 210 |
| Average molecular weight of asphaltene | 1200 | 2500 |
| Vanadium content in asphaltene (ppm) | 900 | 4000 |
| Nickel content in asphaltene (ppm) | 300 | 450 |
| Sulfur content in asphaltene (ppm) | 3.1 | 4.5 |
| Consumption of hydrogen (SCF/BBL) | 420 | 980 |

The above result clearly indicates not only that the performance of catalyst (l) is excellent but also that there is a remarkable difference between both catalysts. That is to say when a product oils of the same asphaltene content are obtained by the use of Catalysts (l) and (k), the consumption of hydrogen differs greatly according to which of them is used.

As is clear from these results, that in order to achieve the same asphaltene cracking rate by the use of catalysts (l) and (k), the consumption of hydrogen in the case of using catalyst (k) is about twice that in the case of using catalyst (l). Furthermore, the vanadium removal rate is about ½ when catalyst (k) is used as compared with that when catalyst (l) is used.

Also, in such a case, the average molecular weight of asphaltene decreases to ½ or less of its initial value and the amounts of vanadium, nickel and sulfur present in the asphaltene also decrease selectively. Thus, it will be understood that the catalyst of this invention has a remarkable catalytic activity.

Figure 10:
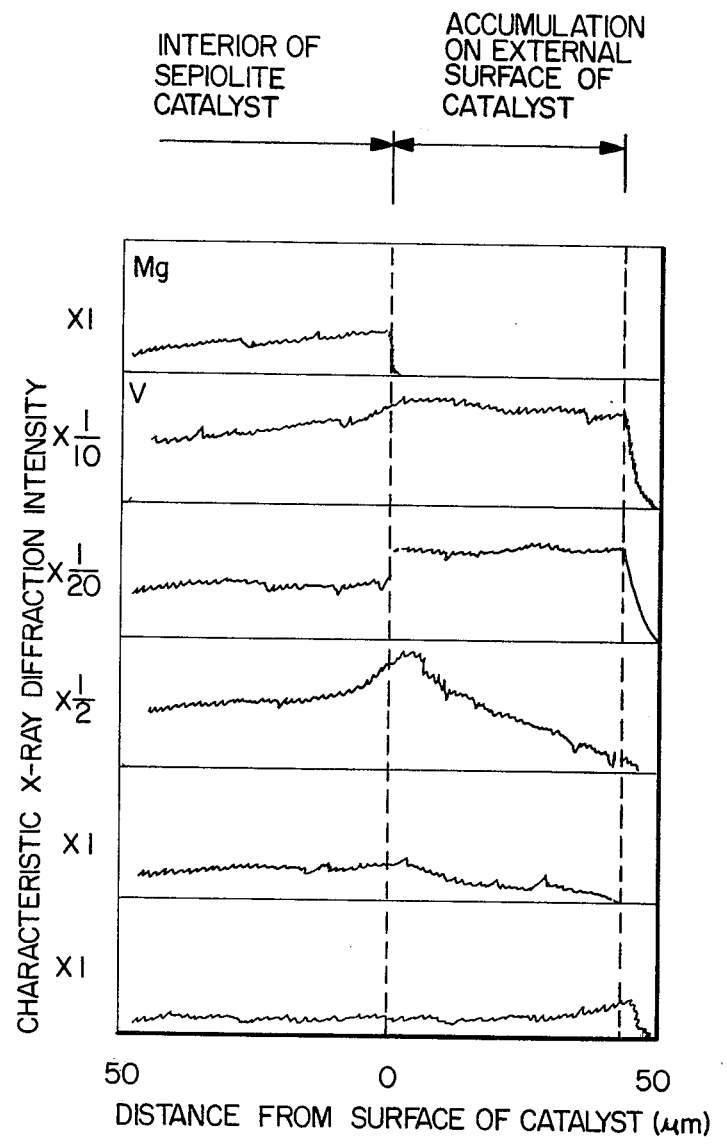
FIG. 10 indicates the characteristic X-ray diffraction pattern of the used catalyst.

The result of the characteristic X-ray analysis which was made with regard to the catalyst (l) used in the treatment under the above-mentioned conditions is shown in FIG. 10.

It has hitherto been considered that the heavy metals removed from heavy hydrocarbon oils during their hydrotreatment are mostly accumulated in the interior of the catalyst, but as is shown in FIG. 10, it is found that in the case of the catalyst of this invention, the metals removed from the oils are accumulated and fixed even on the external surface of the catalyst and Co and Mo supported beforehand on the catalyst as the additional catalytic components are also found in admixture with the accumulation. Also, the powder X-ray diffraction of the catalyst used gives the diffraction pattern of the $V_3S_4$ phase which clearly indicates that not only the $VS_x$ on the substrate but also the vanadium sulfide in which a part of vanadium has been replaced by additional catalytic components or the composite vanadium sulfide supported on the substrate as a solid solution has catalytic action effective for the hydrotreatment of heavy hydrocarbon oils, such as asphaltene cracking, vanadium removal reaction and the like.

What is claimed is:

1. A process of preparing a catalyst for the hydrotreatment of heavy hydrocarbon oils which comprises contacting a substrate of porous clay mineral consisting essentially of magnesium silicate and having a double-chain structure, with a heavy hydrocarbon oil containing at least 200 ppm by weight of vanadium, at a temperature of 350°–450° C., under a hydrogen pressure of 30–250 atm., so as to accumulate at least about 2% by weight of vanadium on said substrate.

2. The process as defined in claim 1 wherein said substrate is one or more minerals selected from naturally occurring sepiolite, attapulgite and palygorskite.

3. The process as defined in claim 1 or 2 wherein one or more catalytic components selected from the group consisting of molybdenum, cobalt, nickel, tungsten, copper, boron, phosphorus and titanium is supported on, or incorporated in, the substrate.

4. The process as defined in claim 1 or 2 wherein said substrate is contacted with said oil in a reactor under the conditions of a hydrogen to oil ratio of 100–2,000 normal liter/liter, a temperature of 350°–450° C., a hydrogen pressure of 30–250 atm., and a liquid space velocity of 0.1–10 hr$^{-1}$ and thereafter said reactor with the resulting catalyst are conducted to hydrotreatment of hydrocarbon oils.

* * * * *

UNITED STATES PATENT AND TRADEMARK OFFICE
CERTIFICATE OF CORRECTION

PATENT NO. : 4,326,991

DATED : April 27, 1982

INVENTOR(S) : Sachio Asaoka et al.

It is certified that error appears in the above-identified patent and that said Letters Patent is hereby corrected as shown below:

On the title page, Item [75] delete "Takeo Ono".

Signed and Sealed this

Tenth Day of August 1982

[SEAL]

Attest:

GERALD J. MOSSINGHOFF

Attesting Officer     Commissioner of Patents and Trademarks